US010496101B2

(12) United States Patent
Ghneim et al.

(10) Patent No.: US 10,496,101 B2
(45) Date of Patent: Dec. 3, 2019

(54) TRAILER BACKUP ASSIST SYSTEM WITH MULTI-PURPOSE CAMERA IN A SIDE MIRROR ASSEMBLY OF A VEHICLE

(71) Applicant: Ford Global Technologies, LLC, Dearborn, MI (US)

(72) Inventors: Maher Ghneim, Plymouth, MI (US); Yasmin Jawad, Dearborn Heights, MI (US); Jennifer Danielle Shaw, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 14/965,017

(22) Filed: Dec. 10, 2015

(65) Prior Publication Data
US 2017/0120828 A1    May 4, 2017

Related U.S. Application Data

(63) Continuation of application No. 14/924,851, filed on Oct. 28, 2015, now Pat. No. 9,836,060.

(51) Int. Cl.
*G05D 1/00*    (2006.01)
*G05D 1/02*    (2006.01)
(Continued)

(52) U.S. Cl.
CPC ........... *G05D 1/0246* (2013.01); *B60R 1/006* (2013.01); *B60R 1/12* (2013.01); *B60W 10/04* (2013.01);
(Continued)

(58) Field of Classification Search
CPC .... B60W 10/04; B60W 10/184; B60W 10/20; B60W 50/082; B60W 50/10; B60W 50/14; B60R 1/006; B60R 1/12
(Continued)

(56) References Cited

U.S. PATENT DOCUMENTS 3,542,390 A    11/1970  Fikes et al.
3,605,088 A     9/1971  Savelli
(Continued)

FOREIGN PATENT DOCUMENTS

CN    101833869 A    9/2010
CN    201923085 U    8/2011
(Continued)

OTHER PUBLICATIONS

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.
(Continued)

*Primary Examiner* — Thomas G Black
*Assistant Examiner* — Luke Huynh
(74) *Attorney, Agent, or Firm* — Frank Lollo; Price Heneveld LLP

(57) ABSTRACT

A side mirror assembly of a vehicle is provided herein. The side mirror assembly includes a body portion and a camera mounted to the body portion for capturing images of a rear and a side-vehicle operating environment. The camera includes a horizontal field of view angle defined by a first horizontal extent intersecting a centerline longitudinal axis of the vehicle and a second horizontal extent making an angle with a lateral axis of the vehicle that intersects the camera.

20 Claims, 10 Drawing Sheets

(51) Int. Cl.
- *B60W 10/04* (2006.01)
- *B60W 10/184* (2012.01)
- *B60W 10/20* (2006.01)
- *B60W 50/08* (2012.01)
- *B60W 50/10* (2012.01)
- *B60W 50/14* (2012.01)
- *B60R 1/00* (2006.01)
- *B60R 1/12* (2006.01)
- *G06K 9/00* (2006.01)

(52) U.S. Cl.
CPC .......... *B60W 10/184* (2013.01); *B60W 10/20* (2013.01); *B60W 50/082* (2013.01); *B60W 50/10* (2013.01); *B60W 50/14* (2013.01); *G06K 9/00791* (2013.01); *B60R 2001/1253* (2013.01); *B60R 2300/302* (2013.01); *B60R 2300/60* (2013.01); *B60W 2050/143* (2013.01); *B60W 2050/146* (2013.01); *B60W 2520/10* (2013.01); *B60W 2520/14* (2013.01); *B60W 2720/22* (2013.01); *G05D 2201/0213* (2013.01)

(58) Field of Classification Search
USPC .......................................................... 701/41
See application file for complete search history.

(56) References Cited

U.S. PATENT DOCUMENTS

| | | |
|---|---|---|
| 3,787,077 A | 1/1974 | Sanders |
| 3,833,928 A | 9/1974 | Gavit et al. |
| 3,860,257 A | 1/1975 | Mesley |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |
| 4,277,804 A | 7/1981 | Robison |
| 4,366,966 A | 1/1983 | Ratsko et al. |
| 4,735,432 A | 4/1988 | Brown |
| 4,752,080 A | 6/1988 | Rogers |
| 4,848,449 A | 7/1989 | Martinet et al. |
| 4,848,499 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,155,683 A | 10/1992 | Rahim |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,461,357 A | 10/1995 | Yoshioka et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,947,588 A | 9/1999 | Huang |
| 5,980,048 A | 11/1999 | Rannells, Jr. et al. |
| 6,041,582 A | 3/2000 | Tiede et al. |
| 6,042,196 A | 3/2000 | Nakamura et al. |
| 6,124,709 A | 9/2000 | Allwine |
| 6,142,372 A | 11/2000 | Wright |
| 6,151,175 A | 11/2000 | Osha |
| 6,182,010 B1 | 1/2001 | Berstis |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boras et al. |
| 6,268,800 B1 | 7/2001 | Howard |
| 6,292,094 B1 | 9/2001 | Deng et al. |
| 6,318,747 B1 | 11/2001 | Ratican |
| 6,351,698 B1 | 2/2002 | Kubota et al. |
| 6,411,898 B2 | 6/2002 | Ishida et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,526,335 B1 | 2/2003 | Treyz et al. |
| 6,539,288 B2 | 3/2003 | Ishida et al. |
| 6,568,093 B2 | 5/2003 | Kogiso et al. |
| 6,577,952 B2 | 6/2003 | Geier et al. |
| 6,587,760 B2 | 7/2003 | Okamoto |
| 6,593,960 B1 | 7/2003 | Sugimoto et al. |
| 6,655,710 B2 | 12/2003 | Lindell et al. |
| 6,668,225 B2 | 12/2003 | Oh et al. |
| 6,683,539 B2 | 1/2004 | Trajkovic et al. |
| 6,704,653 B2 | 3/2004 | Kuriya et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,837,432 B2 | 1/2005 | Tsikos et al. |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,933,837 B2 | 8/2005 | Gunderson et al. |
| 6,956,468 B2 | 10/2005 | Lee et al. |
| 6,959,970 B2 | 11/2005 | Tseng |
| 6,970,184 B2 | 11/2005 | Hirama et al. |
| 6,989,739 B2 | 1/2006 | Li |
| 6,999,856 B2 | 2/2006 | Lee et al. |
| 7,005,974 B2 | 2/2006 | McMahon et al. |
| 7,006,127 B2 | 2/2006 | Mizusawa et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,039,504 B2 | 5/2006 | Tanaka et al. |
| 7,046,127 B2 | 5/2006 | Boddy |
| 7,058,493 B2 | 6/2006 | Inagaki |
| 7,085,634 B2 | 8/2006 | Endo et al. |
| 7,089,101 B2 | 8/2006 | Fischer et al. |
| 7,136,754 B2 | 11/2006 | Hahn et al. |
| 7,142,098 B2 | 11/2006 | Lang et al. |
| 7,154,385 B2 | 12/2006 | Lee et al. |
| 7,159,890 B2 | 1/2007 | Craig et al. |
| 7,161,616 B1 | 1/2007 | Okamoto et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,195,267 B1 | 3/2007 | Thompson |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,237,790 B2 | 7/2007 | Gehring et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,352,388 B2 | 4/2008 | Miwa et al. |
| 7,353,110 B2 | 4/2008 | Kim |
| 7,401,871 B2 | 7/2008 | Lu et al. |

(56) References Cited

U.S. PATENT DOCUMENTS

| | | | |
|---|---|---|---|
| 7,405,557 B2 | 7/2008 | Spratte et al. | |
| 7,413,266 B2 | 8/2008 | Lenz et al. | |
| 7,425,889 B2 | 9/2008 | Widmann et al. | |
| 7,447,585 B2 | 11/2008 | Tandy, Jr. et al. | |
| 7,451,020 B2 | 11/2008 | Goetting et al. | |
| 7,463,137 B2 | 12/2008 | Wishart et al. | |
| 7,504,995 B2 | 3/2009 | Lawrence et al. | |
| 7,532,109 B2 | 5/2009 | Takahama et al. | |
| 7,537,256 B2 | 5/2009 | Gates et al. | |
| 7,540,523 B2 | 6/2009 | Russell et al. | |
| 7,548,155 B2 | 6/2009 | Schutt et al. | |
| 7,568,716 B2 | 8/2009 | Dietz | |
| 7,619,680 B1 | 11/2009 | Bingle et al. | |
| 7,623,952 B2 | 11/2009 | Unruh et al. | |
| 7,640,108 B2 | 12/2009 | Shimizu et al. | |
| 7,648,153 B2 | 1/2010 | Metternich et al. | |
| 7,658,524 B2 | 2/2010 | Johnson et al. | |
| 7,688,221 B2 * | 3/2010 | Watanabe | B60R 1/00 180/167 |
| 7,690,737 B2 | 4/2010 | Lu | |
| 7,692,557 B2 | 4/2010 | Medina et al. | |
| 7,702,133 B2 | 4/2010 | Muramatsu et al. | |
| 7,706,944 B2 | 4/2010 | Tanaka et al. | |
| 7,715,953 B2 | 5/2010 | Shepard | |
| 7,731,302 B2 | 6/2010 | Tandy, Jr. et al. | |
| 7,777,615 B2 | 8/2010 | Okuda | |
| 7,793,965 B2 | 9/2010 | Padula | |
| 7,798,263 B2 | 9/2010 | Tandy, Jr. et al. | |
| 7,878,545 B2 | 2/2011 | Rhymer et al. | |
| 7,904,222 B2 | 3/2011 | Lee et al. | |
| 7,905,507 B2 | 3/2011 | Perri | |
| 7,950,751 B2 | 5/2011 | Offerle et al. | |
| 7,953,536 B2 | 5/2011 | Katrak | |
| 7,969,326 B2 | 6/2011 | Sakakibara | |
| 7,974,444 B2 | 7/2011 | Hongo | |
| 8,010,252 B2 | 8/2011 | Getman et al. | |
| 8,010,253 B2 | 8/2011 | Lundquist | |
| 8,036,792 B2 | 10/2011 | Dechamp | |
| 8,038,166 B1 | 10/2011 | Piesinger | |
| 8,044,776 B2 | 10/2011 | Schofield et al. | |
| 8,044,779 B2 | 10/2011 | Hahn et al. | |
| 8,068,019 B2 | 11/2011 | Bennie et al. | |
| 8,073,594 B2 | 12/2011 | Lee et al. | |
| 8,138,899 B2 | 3/2012 | Ghneim | |
| 8,139,109 B2 | 3/2012 | Schmiedel et al. | |
| 8,157,284 B1 | 4/2012 | McGhie et al. | |
| 8,165,770 B2 | 4/2012 | Getman et al. | |
| 8,167,444 B2 | 5/2012 | Lee et al. | |
| 8,170,726 B2 | 5/2012 | Chen et al. | |
| 8,174,576 B2 | 5/2012 | Akatsuka et al. | |
| 8,180,543 B2 | 5/2012 | Futamura et al. | |
| 8,190,364 B2 | 5/2012 | Rekow | |
| 8,191,915 B2 | 6/2012 | Freese, V et al. | |
| 8,192,036 B2 | 6/2012 | Lee et al. | |
| 8,192,064 B2 | 6/2012 | Johnson et al. | |
| 8,205,704 B2 | 6/2012 | Kadowaki et al. | |
| 8,215,436 B2 | 7/2012 | DeGrave et al. | |
| 8,223,204 B2 | 7/2012 | Hahn | |
| 8,224,078 B2 | 7/2012 | Boncyk et al. | |
| 8,244,442 B2 | 8/2012 | Craig et al. | |
| 8,260,518 B2 | 9/2012 | Englert | |
| 8,267,485 B2 | 9/2012 | Barlsen et al. | |
| 8,280,607 B2 | 10/2012 | Gatti et al. | |
| 8,290,657 B2 | 10/2012 | Lavoie | |
| 8,308,182 B2 | 11/2012 | Ortmann et al. | |
| 8,310,353 B2 | 11/2012 | Hinninger et al. | |
| 8,319,614 B2 | 11/2012 | Takano | |
| 8,319,618 B2 | 11/2012 | Gomi et al. | |
| 8,319,663 B2 | 11/2012 | Von Reyher et al. | |
| 8,326,504 B2 | 12/2012 | Wu et al. | |
| 8,332,097 B2 | 12/2012 | Chiba et al. | |
| 8,342,560 B2 | 1/2013 | Albers et al. | |
| 8,374,749 B2 | 2/2013 | Tanaka | |
| 8,380,390 B2 | 2/2013 | Sy et al. | |
| 8,380,416 B2 | 2/2013 | Offerle et al. | |
| 8,390,696 B2 | 3/2013 | Komoto et al. | |
| 8,393,632 B2 | 3/2013 | Vortmeyer et al. | |
| 8,401,744 B2 | 3/2013 | Chiocco | |
| 8,414,171 B2 | 4/2013 | Kawamura | |
| 8,427,288 B2 | 4/2013 | Schofield et al. | |
| 8,451,107 B2 | 5/2013 | Lu et al. | |
| 8,469,125 B2 | 6/2013 | Yu et al. | |
| 8,471,691 B2 | 6/2013 | Zhang et al. | |
| 8,498,770 B2 | 7/2013 | Takano | |
| 8,504,243 B2 | 8/2013 | Kageyama | |
| 8,548,680 B2 | 10/2013 | Ryerson et al. | |
| 8,548,683 B2 | 10/2013 | Cebon et al. | |
| 8,576,115 B2 | 11/2013 | Basten | |
| 8,626,382 B2 | 1/2014 | Obradovich | |
| 8,645,015 B2 | 2/2014 | Oetiker et al. | |
| 8,675,953 B1 | 3/2014 | Elwell et al. | |
| 8,755,984 B2 | 6/2014 | Rupp et al. | |
| 8,807,261 B2 | 8/2014 | Subrt et al. | |
| 8,811,698 B2 | 8/2014 | Kono et al. | |
| 8,823,796 B2 | 9/2014 | Shen et al. | |
| 8,825,221 B2 | 9/2014 | Hueger et al. | |
| 8,825,328 B2 | 9/2014 | Rupp et al. | |
| 8,833,789 B2 | 9/2014 | Anderson | |
| 8,836,786 B2 | 9/2014 | Seger et al. | |
| 8,868,329 B2 | 10/2014 | Ikeda et al. | |
| 8,886,400 B2 | 11/2014 | Kossira et al. | |
| 8,888,120 B2 | 11/2014 | Trevino | |
| 8,909,426 B2 | 12/2014 | Rhode et al. | |
| 8,928,757 B2 | 1/2015 | Maekawa et al. | |
| 8,930,140 B2 | 1/2015 | Trombley et al. | |
| 8,939,462 B2 | 1/2015 | Adamczyk et al. | |
| 8,955,865 B2 | 2/2015 | Fortin et al. | |
| 8,957,786 B2 | 2/2015 | Stempnik et al. | |
| 8,972,109 B2 | 3/2015 | Lavoie et al. | |
| 9,008,913 B1 | 4/2015 | Sears et al. | |
| 9,013,286 B2 | 4/2015 | Chen et al. | |
| 9,026,311 B1 | 5/2015 | Pieronek et al. | |
| 9,042,603 B2 | 5/2015 | Elwart et al. | |
| 9,082,315 B2 | 7/2015 | Lin et al. | |
| 9,094,583 B2 | 7/2015 | Shih et al. | |
| 9,102,271 B2 | 8/2015 | Trombley et al. | |
| 9,108,598 B2 | 8/2015 | Headley | |
| 9,114,832 B2 | 8/2015 | Wang et al. | |
| 9,120,358 B2 | 9/2015 | Motts et al. | |
| 9,120,359 B2 | 9/2015 | Chiu et al. | |
| 9,132,856 B2 | 9/2015 | Shepard | |
| 9,156,496 B2 | 10/2015 | Greenwood et al. | |
| 9,164,955 B2 | 10/2015 | Lavoie et al. | |
| 9,180,890 B2 | 11/2015 | Lu et al. | |
| 9,187,124 B2 | 11/2015 | Trombley et al. | |
| 9,208,686 B2 | 12/2015 | Takamatsu | |
| 9,227,474 B2 | 1/2016 | Liu | |
| 9,238,483 B2 | 1/2016 | Hafner et al. | |
| 9,248,858 B2 | 2/2016 | Lavoie et al. | |
| 9,264,672 B2 | 2/2016 | Lynam | |
| 9,296,422 B2 | 3/2016 | Lavoie | |
| 9,315,151 B2 | 4/2016 | Taylor et al. | |
| 9,315,212 B1 | 4/2016 | Kyrtsos et al. | |
| 9,321,483 B2 | 4/2016 | Headley | |
| 9,335,162 B2 | 5/2016 | Kyrtsos et al. | |
| 9,340,228 B2 | 5/2016 | Xu et al. | |
| 9,352,777 B2 | 5/2016 | Lavoie et al. | |
| 9,393,996 B2 | 7/2016 | Goswami et al. | |
| 9,400,897 B2 | 7/2016 | Bruening et al. | |
| 9,428,188 B2 | 8/2016 | Schwindt et al. | |
| 9,434,414 B2 | 9/2016 | Lavoie | |
| 9,464,913 B2 | 10/2016 | Brown et al. | |
| 9,499,018 B2 | 11/2016 | Gehrke et al. | |
| 9,500,497 B2 | 11/2016 | Lavoie et al. | |
| 9,508,189 B2 | 11/2016 | Han et al. | |
| 9,520,063 B2 | 12/2016 | Noh | |
| 9,610,974 B2 | 4/2017 | Herzog et al. | |
| 9,616,923 B2 | 4/2017 | Lavoie | |
| 9,623,904 B2 | 4/2017 | Lavoie et al. | |
| 9,676,377 B2 | 6/2017 | Hafner et al. | |
| 9,798,953 B2 | 10/2017 | Hu | |
| 9,836,060 B2 | 12/2017 | Ghneim et al. | |
| 9,840,278 B2 | 12/2017 | Lavoie et al. | |
| 10,046,800 B2 | 8/2018 | Hu et al. | |

(56) References Cited

U.S. PATENT DOCUMENTS

| | | |
|---|---|---|
| 2001/0024333 A1 | 9/2001 | Rost |
| 2001/0037164 A1 | 11/2001 | Hecker |
| 2002/0128764 A1 | 9/2002 | Hecker et al. |
| 2003/0222982 A1 | 12/2003 | Hamdan et al. |
| 2003/0234512 A1 | 12/2003 | Holub |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0119822 A1 | 6/2004 | Custer et al. |
| 2004/0130441 A1 | 7/2004 | Lee et al. |
| 2004/0222881 A1 | 11/2004 | Deng et al. |
| 2005/0000738 A1 | 1/2005 | Gehring et al. |
| 2005/0046696 A1 | 3/2005 | Lang et al. |
| 2005/0073433 A1 | 4/2005 | Gunderson et al. |
| 2005/0074143 A1 | 4/2005 | Kawai |
| 2005/0128059 A1 | 6/2005 | Vause |
| 2005/0146607 A1 | 7/2005 | Linn et al. |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0171704 A1 | 8/2006 | Bingle et al. |
| 2006/0176370 A1 | 8/2006 | Chen et al. |
| 2006/0190147 A1 | 8/2006 | Lee et al. |
| 2006/0244579 A1 | 11/2006 | Raab |
| 2006/0250501 A1 | 11/2006 | Widmann et al. |
| 2006/0287821 A1 | 12/2006 | Lin |
| 2006/0293800 A1 | 12/2006 | Bauer et al. |
| 2007/0019421 A1 | 1/2007 | Kregness et al. |
| 2007/0027581 A1 | 2/2007 | Bauer et al. |
| 2007/0057816 A1 | 3/2007 | Sakakibara et al. |
| 2007/0058273 A1 | 3/2007 | Ito et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0198190 A1 | 8/2007 | Bauer et al. |
| 2007/0216136 A1 | 9/2007 | Dietz |
| 2007/0285808 A1 | 12/2007 | Beale |
| 2008/0027599 A1 | 1/2008 | Logan et al. |
| 2008/0027635 A1 | 1/2008 | Tengler et al. |
| 2008/0143593 A1 | 6/2008 | Graziano et al. |
| 2008/0147277 A1 | 6/2008 | Lu et al. |
| 2008/0180526 A1 | 7/2008 | Trevino |
| 2008/0186384 A1 | 8/2008 | Ishii et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0063053 A1 | 3/2009 | Basson et al. |
| 2009/0079828 A1 | 3/2009 | Lee et al. |
| 2009/0085775 A1 | 4/2009 | Otsuka et al. |
| 2009/0093928 A1 | 4/2009 | Getman et al. |
| 2009/0153663 A1 | 6/2009 | Ramos |
| 2009/0198425 A1 | 8/2009 | Englert |
| 2009/0228182 A1 | 9/2009 | Waldbauer et al. |
| 2009/0231441 A1 | 9/2009 | Walker et al. |
| 2009/0248346 A1 | 10/2009 | Fennel et al. |
| 2009/0271078 A1 | 10/2009 | Dickinson |
| 2009/0300701 A1 | 12/2009 | Karaoguz et al. |
| 2009/0306854 A1 | 12/2009 | Dechamp |
| 2009/0306861 A1 | 12/2009 | Schumann et al. |
| 2010/0060739 A1 | 3/2010 | Salazar |
| 2010/0063702 A1 | 3/2010 | Sabelstrom et al. |
| 2010/0156667 A1 | 6/2010 | Bennie et al. |
| 2010/0156671 A1 | 6/2010 | Lee et al. |
| 2010/0157061 A1 | 6/2010 | Katsman et al. |
| 2010/0171828 A1 | 7/2010 | Ishii |
| 2010/0194888 A1 | 8/2010 | McElroy et al. |
| 2010/0222964 A1 | 9/2010 | Dechamp |
| 2010/0324770 A1 | 12/2010 | Ramsey et al. |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0050903 A1 | 3/2011 | Vorobiev |
| 2011/0063425 A1 | 3/2011 | Tieman |
| 2011/0087398 A1 | 4/2011 | Lu et al. |
| 2011/0102583 A1 | 5/2011 | Kinzalow |
| 2011/0112721 A1 | 5/2011 | Wang et al. |
| 2011/0125457 A1 | 5/2011 | Lee et al. |
| 2011/0149077 A1 | 6/2011 | Robert |
| 2011/0153198 A1 | 6/2011 | Kokkas et al. |
| 2011/0160956 A1 | 6/2011 | Chung et al. |
| 2011/0216199 A1 | 9/2011 | Trevino et al. |
| 2011/0257860 A1 | 10/2011 | Getman et al. |
| 2012/0039537 A1 | 2/2012 | Keys |
| 2012/0041658 A1 | 2/2012 | Turner |
| 2012/0062743 A1 | 3/2012 | Lynam et al. |
| 2012/0062744 A1 | 3/2012 | Schofield et al. |
| 2012/0062745 A1* | 3/2012 | Han .............. B62D 15/029 348/148 |
| 2012/0086808 A1 | 4/2012 | Lynam |
| 2012/0095649 A1 | 4/2012 | Klier et al. |
| 2012/0109471 A1 | 5/2012 | Wu |
| 2012/0112434 A1 | 5/2012 | Albers et al. |
| 2012/0170286 A1 | 7/2012 | Bodem et al. |
| 2012/0185131 A1 | 7/2012 | Headley |
| 2012/0191285 A1 | 7/2012 | Woolf et al. |
| 2012/0200706 A1 | 8/2012 | Greenwood et al. |
| 2012/0212616 A1 | 8/2012 | Usami et al. |
| 2012/0221168 A1 | 8/2012 | Zeng et al. |
| 2012/0224059 A1 | 9/2012 | Takamatsu |
| 2012/0229639 A1 | 9/2012 | Singleton |
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 | 12/2012 | Watanabe |
| 2012/0314073 A1 | 12/2012 | Shimoda et al. |
| 2012/0316732 A1 | 12/2012 | Auer |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0038731 A1 | 2/2013 | Brey et al. |
| 2013/0057397 A1 | 3/2013 | Cutler |
| 2013/0076007 A1 | 3/2013 | Goode |
| 2013/0082453 A1 | 4/2013 | Padula |
| 2013/0120161 A1 | 5/2013 | Wakabayashi et al. |
| 2013/0120572 A1 | 5/2013 | Kwon |
| 2013/0128047 A1 | 5/2013 | Lee |
| 2013/0158803 A1 | 6/2013 | Headley |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0229524 A1 | 9/2013 | Vovkushevsky et al. |
| 2013/0250114 A1 | 9/2013 | Lu |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0012465 A1 | 1/2014 | Shank et al. |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1* | 3/2014 | Lu .............. B60R 1/002 348/148 |
| 2014/0088797 A1 | 3/2014 | McClain et al. |
| 2014/0088824 A1 | 3/2014 | Ishimoto |

(56) References Cited

U.S. PATENT DOCUMENTS

| | | | |
|---|---|---|---|
| 2014/0121883 A1 | 5/2014 | Shen et al. |
| 2014/0125795 A1 | 5/2014 | Yerke |
| 2014/0160276 A1 | 6/2014 | Pliefke et al. |
| 2014/0168415 A1 | 6/2014 | Ihlenburg et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0267727 A1 | 9/2014 | Alaniz |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0307095 A1 | 10/2014 | Wierich |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0354811 A1 | 12/2014 | Weber |
| 2014/0358429 A1 | 12/2014 | Shutko et al. |
| 2014/0379217 A1 | 12/2014 | Rupp et al. |
| 2015/0002669 A1 | 1/2015 | Reed et al. |
| 2015/0002670 A1 | 1/2015 | Bajpai |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0077557 A1 | 3/2015 | Han et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavioe |
| 2015/0142211 A1 | 5/2015 | Shehata et al. |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0172582 A1 | 6/2015 | Kiyohara et al. |
| 2015/0179075 A1 | 6/2015 | Lee |
| 2015/0191200 A1 | 7/2015 | Tsubaki et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217692 A1 | 8/2015 | Yanagawa |
| 2015/0217693 A1 | 8/2015 | Pliefke et al. |
| 2015/0232031 A1 | 8/2015 | Kitaura et al. |
| 2015/0235484 A1 | 8/2015 | Kraeling et al. |
| 2015/0251602 A1 | 9/2015 | Baur et al. |
| 2015/0269444 A1 | 9/2015 | Lameyre et al. |
| 2015/0344028 A1 | 12/2015 | Gieseke et al. |
| 2015/0369613 A1 | 12/2015 | Stadler |
| 2016/0001705 A1 | 1/2016 | Greenwood et al. |
| 2016/0006922 A1 | 1/2016 | Boudreau et al. |
| 2016/0009288 A1 | 1/2016 | Yu |
| 2016/0023601 A1 | 1/2016 | Windeler |
| 2016/0023603 A1 | 1/2016 | Vico et al. |
| 2016/0039456 A1 | 2/2016 | Lavoie et al. |
| 2016/0052548 A1 | 2/2016 | Singh et al. |
| 2016/0059780 A1 | 3/2016 | Lavoie |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0121889 A1* | 5/2016 | Shimomura ......... B60W 50/14 |
| | | 701/41 |
| 2016/0129939 A1 | 5/2016 | Singh et al. |
| 2016/0152263 A1* | 6/2016 | Singh ................... B60T 8/1708 |
| | | 701/41 |
| 2016/0153778 A1 | 6/2016 | Singh et al. |
| 2016/0207526 A1 | 7/2016 | Franz et al. |
| 2016/0229452 A1 | 8/2016 | Lavoie et al. |
| 2016/0280267 A1 | 9/2016 | Lavoie et al. |
| 2016/0304088 A1 | 10/2016 | Barth |
| 2016/0304122 A1 | 10/2016 | Herzog et al. |
| 2016/0320477 A1 | 11/2016 | Heimberger |
| 2017/0073005 A1 | 3/2017 | Ghneim et al. |
| 2017/0101130 A1 | 4/2017 | Lavoie |
| 2017/0106796 A1 | 4/2017 | Lavoie et al. |

FOREIGN PATENT DOCUMENTS

| | | |
|---|---|---|
| CN | 102582686 B | 9/2013 |
| CN | 203292137 U | 11/2013 |
| DE | 3923676 A1 | 1/1991 |
| DE | 3931518 A1 | 4/1991 |
| DE | 3208595 U1 | 8/1992 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010004920 A1 | 7/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 102012005707 A1 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| DE | 102013000198 A1 | 7/2014 |
| EP | 0418653 A1 | 3/1991 |
| EP | 0433858 A2 | 6/1991 |
| EP | 1245445 A2 | 10/2002 |
| EP | 1361543 A2 | 11/2003 |
| EP | 1442931 A2 | 8/2004 |
| EP | 1593552 B1 | 3/2007 |
| EP | 1810913 A1 | 7/2007 |
| EP | 2199188 A2 | 6/2010 |
| EP | 2388180 A2 | 11/2011 |
| EP | 2431225 A1 | 3/2012 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2682329 A1 | 1/2014 |

(56) References Cited

FOREIGN PATENT DOCUMENTS

| | | | |
|---|---|---|---|
| EP | 2803944 A2 | 11/2014 |
| FR | 2515379 A1 | 4/1983 |
| FR | 2980750 A1 | 4/2013 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 08289286 A | 11/1996 |
| JP | 09267762 A | 10/1997 |
| JP | 09328078 A | 12/1997 |
| JP | 10001063 A | 1/1998 |
| JP | 11124051 A | 5/1999 |
| JP | 11278319 A | 10/1999 |
| JP | 2000267181 A | 9/2000 |
| JP | 2002012172 A | 1/2002 |
| JP | 2002068032 A | 3/2002 |
| JP | 2003034261 A | 2/2003 |
| JP | 2003148938 A | 5/2003 |
| JP | 2004114879 A | 4/2004 |
| JP | 3716722 B2 | 11/2005 |
| JP | 2008027138 A | 2/2008 |
| JP | 2008027138 A1 | 2/2008 |
| JP | 2008123028 A | 5/2008 |
| JP | 2012105158 A | 5/2012 |
| JP | 2012166647 A | 9/2012 |
| JP | 2014002056 A | 1/2014 |
| JP | 2014034289 A | 2/2014 |
| KR | 1020060012710 A | 2/2006 |
| KR | 1020070034729 A | 3/2007 |
| NO | 2014123575 A1 | 8/2014 |
| TW | 200930010 A | 7/2009 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2013048994 A1 | 4/2013 |
| WO | 2013070539 A1 | 5/2013 |
| WO | 2013081984 A1 | 6/2013 |
| WO | 2014006500 A2 | 1/2014 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014174027 A1 | 10/2014 |
| WO | 2015074027 A1 | 5/2015 |
| WO | 2015187467 A1 | 12/2015 |

OTHER PUBLICATIONS

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.
Kristopher Bunker, "2012 Guide to Towing", Trailer Life, 2012, pp. 1-42.
"IBall Wireless Trailer Hitch Camera", Product Listing, Amazon, Nov. 2, 2010, pp. 1-5.
M. Wagner, D. Zoebel, and A. Meroth, "An Adaptive Software and Systems Architecture for Driver Assistance Systems Based on Service Orientation" International Journal of Machine Learning and Computing, Oct. 2011, vol. 1, No. 4, pp. 359-365.
"Surround View System", ASL—Vision 360, 2010, pp. 1.
Jae Il Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.
Young Jin Lee, Sung Won Park, Hyeun Cheol Cho, Dong Seop Han, Geun Jo Han, and Kwon Soon Lee; "Development of Auto Alignment System Between Trailer and Freight Wagon Using Electronic Sensors for Intermodal Transportation" IEEE, 2010, pp. 1211-1215.
"Back-Up and Utility Light System", Back-Up Buddy Inc., Plainville, MA, pp. 1-2; date unknown.
Ford Motor Company, "09 F-150", Brochure, www.fordvehicles.com, pp. 1-30.
Michael Paine, "Heavy Vehicle Object Detection Systems", Vehicle Design and Research Pty Lmited for VicRoads, Jun. 2003, pp. 1-22.
A.M.C. Odhams; R.L. Roebuck; C. Cebon, "Implementation of Active Steering on a Multiple Trailer Long Combination Vehicle", Cambridge University, Engineering Department; Cambridge, United Kingdom, pp. 1-13; date unknown.
Dougloas Newcomb, "Range Rover Evoque's Surround Camera System", Tech Feature Friday, Article, Jun. 15, 2012, pp. 1-2.
"Trailer Vision", Trailer Vision Ltd., Brochure, www.trailervision.co.uk, pp. 1-4; date unknown.
Micah Steele, R. Brent Gillespie, "Shared Control Between Human and Machine: Using a Haptic Steering Wheel to Aid in Land Vehicle Guidance", University of Michigan, pp. 1-5; date unknown.
Laszlo Palkovics, Pal Michelberger, Jozsef Bokor, Peter Gaspar, "Adaptive Identification for Heavy-Truck Stability Control", Vehicle Systems Dynamics Supplement, vol. 25, No. sup1, 1996, pp. 502-518.
David Hodo, John Hung, Bob Selfridge, Andrew Schwartz, "Robotic DGM Tow Vehicle Project Overview", Auburn University, US Army Corp of Engineers, pp. 1-9; date unknown.
"Convenience and Loadspace Features" Jaguar Land Rover Limited, 2012, pp. 1-15, http://www.landrover.com/us/en/lr/all-new-range-rover/explore/.
"Rearview Parking Assist Systems", Donmar Sunroofs & Accessories, Brochure, Aug. 2013, pp. 1-13.
"Alpine Electronics Introduces Two New Drive Assist Solutions", Alpine Electronics of America, Inc., Jan. 7, 2010, pp. 1-2.
"Delphi Lane Departure Warning", Delphi Corporation, Troy, Michigan pp. 1-2; date unknown.
Jesus Morales, Anthony Mandow, Jorge L. Martinez, and Alfonso Garcia-Cerezo, "Driver Assistance System for Backward Maneuvers in Passive Multi-trailer Vehicles", International Conference on Intelligent Robots and Systems (IROS), Oct. 7-12, 2012, pp. 4853-4858.
"The Vehicle Rear Lighting System for Safe Driving in Reverse", White Night Rear Lighting Systems, Cruiser Stainless Accessories, pp. 1-3; date unknown.
Microsoft, Navigation System, Sync Powered by Microsoft, Ford Motor Company, Jul. 2009, 196 pgs.
SH.Azadi et al., Automatic Parking of an Articulated Vehicle Using ANFIS, Global Journal of Science, Engineering and Technology, GJSET Publishing, 2013, Issue 14, 2013, pp. 93-104.
"Ford Super Duty: Truck Technologies", Brochure, Sep. 2011, 2 pages.
Kristopher Bunker, "2012 Guide to Towing", Trailer Life, 2012, 38 pages.
A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.
L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.
M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.
F.W. Kienhöfer; D. Cebon, "An Investigation of ABS Strategies for Articulated Vehicles", Cambridge University, Engineering Department, United Kingdom, date unknown, 13 pages.
C .Lundquist; W. Reinelt; O. Enqvist; "Back Driving Assistant for Passenger Cars with Trailer", ZF Lenksysteme GmbH, Schwäbisch Gmünd, Germany, 2006 (SAE Int'l) Jan. 2006, 8 pages.

(56) References Cited

OTHER PUBLICATIONS

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.

Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 6 pages.

A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.

Zare, A. Sharafi; M. Kamyad, A.V., "A New Approach in Intelligent Trailer Parking", IEEE, 2010 2nd International Mechanical and Electrical Technology (ICMET), Sep. 2010, 1 page.

Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.

Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.

Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.

Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.

P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.

Dieter Zöbel, David Polock, Philipp Wojke, "Steering Assistance for Backing Up Articulated Vehicles", Systemics, Cybernetics and Informatics; vol. 1, No. 5, date unknown, 6 pages.

J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.

Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.

Cedric Pradalier and Kane Usher, "Experiments in Autonomous Reversing of a Tractor-Trailer System", 6th International Conference on Field and Service Robotics, inria-00195700, Version 1, Dec. 2007, 10 pages.

Andri Riid, Alar Leibak, Ennu Rüstern, "Fuzzy Backing Control of Truck and Two Trailers", Tallinn University of Technology; Tallinn, Estonia, date unknown, 6 pages.

Jane Mcgrath, "How to Avoid Jackknifing", A Discovery Company, date unknown, 3 pages.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.

Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.

A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.

Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.

Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.

Lee Yong H.; Weiwen Deng; Chin Yuen-Kwok Steve; Mckay Neil, "Feasibility Study for a Vehicle-Trailer Backing Up Control", Refdoc.fr, SAE Transactions, vol. 113, No. 6, 2004, 1 page.

A.M.C. Odhams; R.L. Roebuck; B.A. Jujnovich; D. Cebon, "Active Steering of a Tractor-Semi-Trailer" Proceedings of the Institution of Mechanical Engineers, Part D: Journal of Automobile Engineering, SAGE Journals, vol. 225, No. 7, Jul. 2011, 1 page.

Haviland, G S, "Automatic Brake Control for Trucks—What Good Is It?", TRID, Society of Automotive Engineers, Sep. 1968, 1 page.

William E. Travis; David W. Hodo; David M. Bevly; John Y. Hung, "UGV Trailer Position Estimation Using a Dynamic Base RTK System", American Institute of Aeronautics and Astronautics, date unknown, 12 pages.

"VSE Electronic Trailer Steering", ETS for Trailers, version 2009, VSE Trailer Systems B.V., 2009, 28 pages.

"Telematics Past, Present, and Future," Automotive Service Association, www.ASAshop.org, May 2008, 20 pages.

"Fully Automatic Trailer Tow Hitch With Lin Bus," https://webista.bmw.com/webista/show?id=1860575499&lang=engb&print=1, date unknown, 5 pages.

"VBOX Yaw Rate Sensor With Integral Accelerometers," Racelogic, www.racelogic.co.uk, date unknown, 2 pages.

P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.

Olof Enqvist, "AFS-Assisted Trailer Reversing," Institutionen för systemteknik Deartment of Electrical Engineering, Jan. 27, 2006, 57 pages.

Novak, Domen; Dovzan, Dejan; Grebensek, Rok; Oblak, Simon, "Automated Parking System for a Truck and Trailer, International Conference on Advances in the Internet, Processing, Systems and Interdisciplinary Research", Florence, 2007, WoridCat.org, 13 pgs.

\* cited by examiner

TRAILER BACKUP ASSIST SYSTEM WITH MULTI-PURPOSE CAMERA IN A SIDE MIRROR ASSEMBLY OF A VEHICLE

CROSS-REFERENCE TO RELATED APPLICATION

This patent application is a continuation of U.S. patent application Ser. No. 14/924,851, which was filed on Oct. 28, 2015, now U.S. Pat. No. 9,836,060, entitled "TRAILER BACKUP ASSIST SYSTEM WITH TARGET MANAGEMENT." The aforementioned related application is hereby incorporated by reference in its entirety.

FIELD OF THE INVENTION

The present invention generally relates to trailer backup assist systems, and more particularly to trailer backup assist systems employing imager-based target detection.

BACKGROUND OF THE INVENTION

Reversing a vehicle while towing a trailer can be challenging for many drivers, particularly for drivers that drive with a trailer on an infrequent basis or with various types of trailers. Systems used to assist a driver with backing a trailer can determine the position of the trailer relative to the vehicle with imager-based target detection. The accuracy and reliability of this hitch angle determination can be critical to the operation of the backup assist system.

SUMMARY OF THE INVENTION

According to one aspect of the present invention, a side mirror assembly of a vehicle is provided. The side mirror assembly includes a body portion and a camera mounted to the body portion for capturing images of a rear and a side-vehicle operating environment. The camera includes a horizontal field of view angle defined by a first horizontal extent intersecting a centerline longitudinal axis of the vehicle and a second horizontal extent making an angle with a lateral axis of the vehicle that intersects the camera.

According to another aspect of the present invention, a side mirror assembly of a vehicle is provided. The side mirror assembly includes a body portion and a camera mounted to the body portion for capturing images of a rear and a side-vehicle operating environment. The camera includes a horizontal field of view angle defined by a first horizontal extent intersecting a centerline longitudinal axis of the vehicle and a second horizontal extent making an angle with a lateral axis of the vehicle that intersects the camera. A controller processes the captured images to generate a 360 degree view of the vehicle on a vehicle display and/or provide trailer reverse guidance during a trailer backup maneuver.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Figure 1:
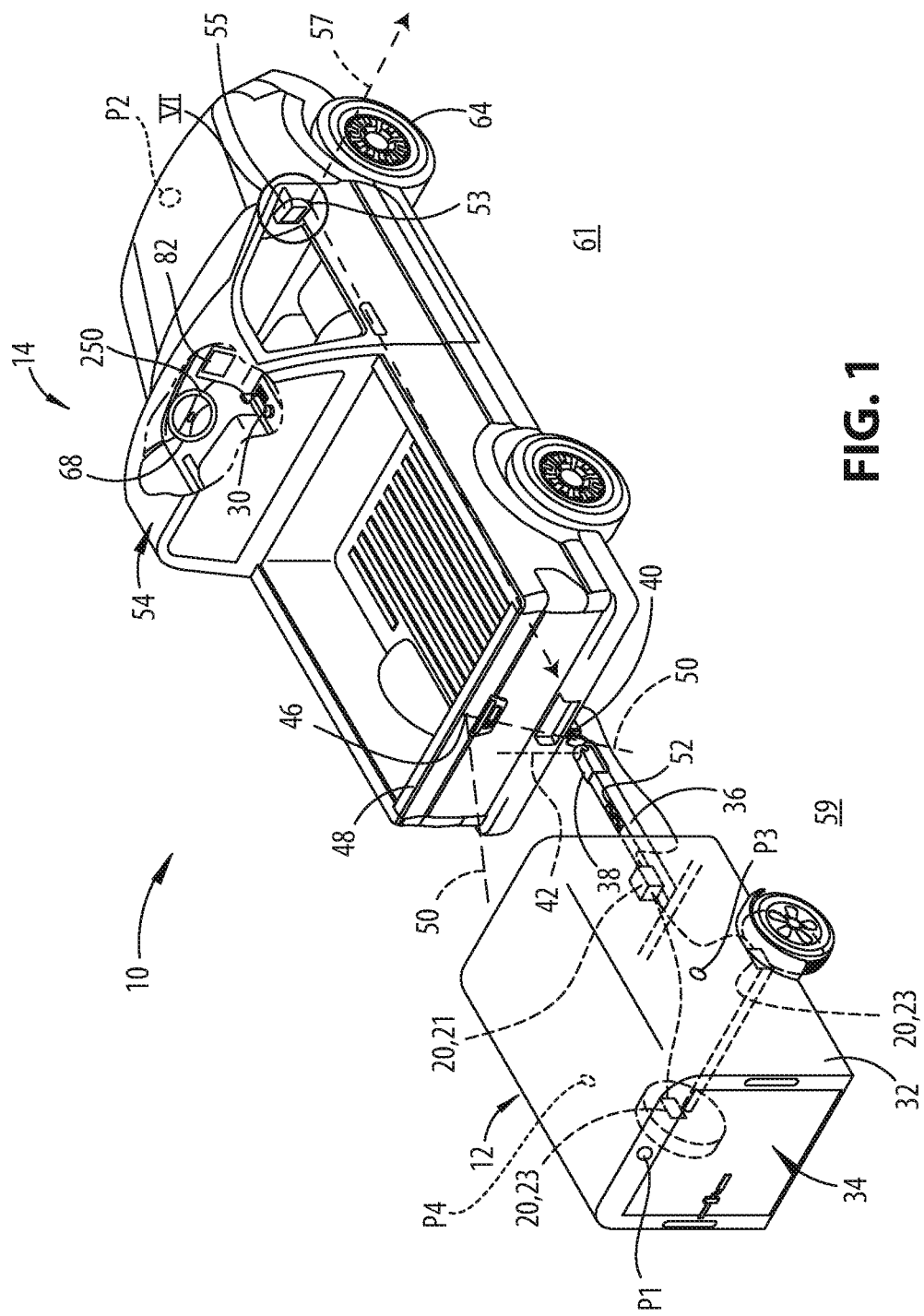
FIG. 1 is a top perspective view of a vehicle attached to a trailer with one embodiment of a hitch angle sensor for operating a trailer backup assist system.
Figure 2:
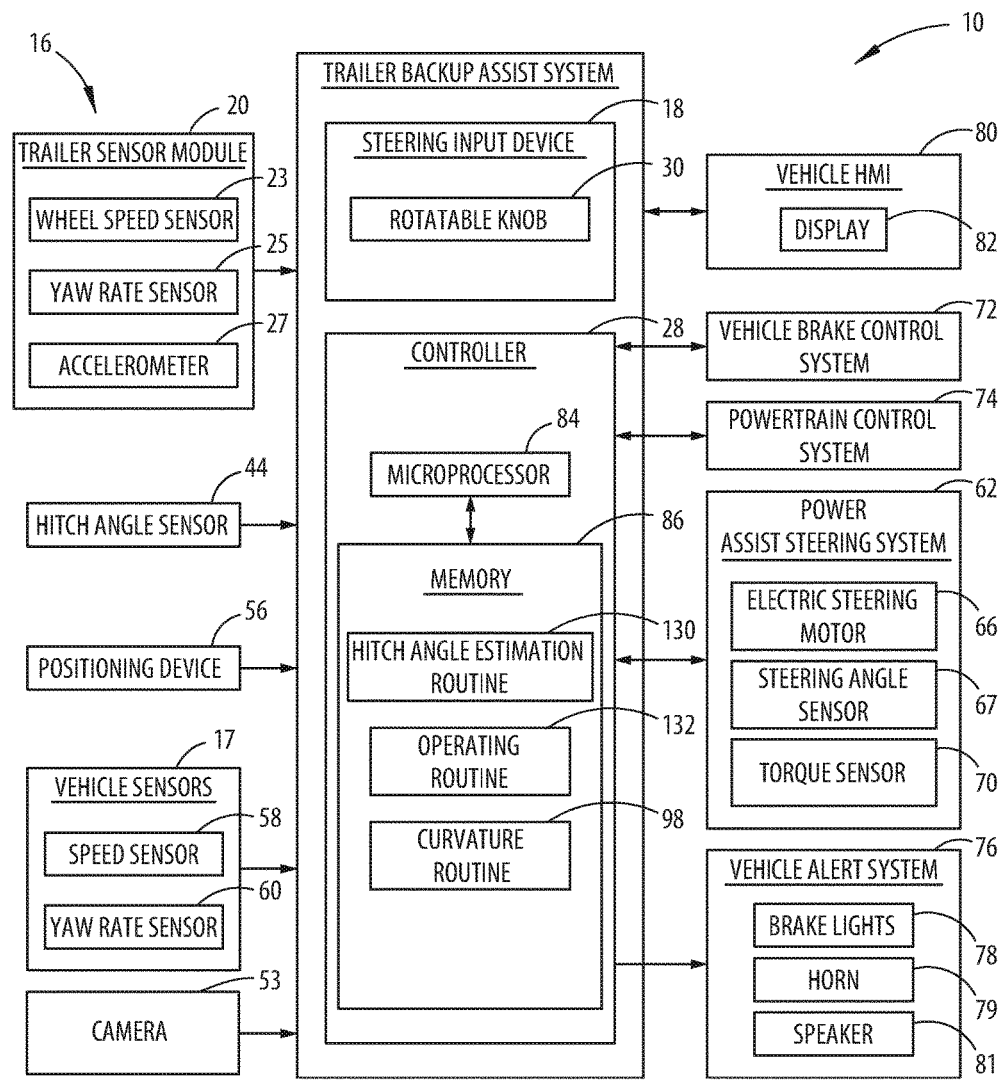
FIG. 2 is a block diagram illustrating one embodiment of the trailer backup assist system having a steering input device, a curvature controller, and a trailer braking system.

Referring to FIGS. 1 and 2, reference numeral 10 generally designates a trailer backup assist system for controlling a backing path of a trailer 12 attached to a vehicle 14 by allowing a driver of the vehicle 14 to specify a desired curvature of the backing path of the trailer 12. In one embodiment, the trailer backup assist system 10 automatically steers the vehicle 14 to guide the trailer 12 on the desired curvature or backing path as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle γ between the trailer 12 and the vehicle 14. In one embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle γ. Accordingly, one embodiment of a sensor module 20 is adapted to attach to the trailer 12 and generate a trailer yaw rate $\omega_2$. The trailer backup assist system 10, according to such an embodiment, may also include a vehicle sensor system 17 that generates a vehicle yaw rate $\omega_1$ and a vehicle speed $v_1$. The controller 28 of the trailer backup assist system 10 may thereby estimate a hitch angle γ based on the trailer yaw rate $\omega_2$, the vehicle yaw rate $\omega_1$, and the vehicle speed $v_1$ in view of a kinematic relationship between the trailer 12 and the vehicle 14. In another embodiment, the sensor system 16 may additionally or alternatively include a hitch angle sensor 44, such as a vision-based system that employs a camera 46 on the vehicle 14 to monitor a target, such as sticker 52 or user-selected points (as described later herein), on the trailer 12 to determine the hitch angle γ.

With respect to the general operation of the trailer backup assist system 10, a steering input device 18 may be provided, such as a rotatable knob 30, for a driver to provide the desired curvature of the trailer 12. As such, the steering input device 18 may be operable between a plurality of selections, such as successive rotated positions of a knob 30, that each provide an incremental change to the desired curvature of the trailer 12. Upon inputting the desired curvature, the controller 28 may generate a steering command for the vehicle 14 to guide the trailer 12 on the desired curvature based on the estimated hitch angle γ and a kinematic relationship between the trailer 12 and the vehicle 14. Therefore, the accuracy of the hitch angle estimation may be critical to operating the trailer backup assist system 10. However, it is appreciated that such a system for instantaneously estimating hitch angle may be used in association with additional or alternative vehicle features, such as trailer sway monitoring.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment may include both a sensor module 20 and a vision-based hitch angle sensor 44 for estimating the hitch angle γ between the vehicle 14 and the trailer 12. The illustrated hitch angle sensor 44 employs a camera 46 (e.g., video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has a field of view 50 located and oriented to capture one or more images of the trailer 12, including a region containing one or more desired target placement zones for at least one sticker 52 to be secured. In the illustrated embodiment, the trailer backup assist system 10 includes a sticker 52 placed on the trailer 12 to allow the trailer backup assist system 10 to utilize information acquired via image acquisition and processing of the sticker 52. For instance, the illustrated camera 46 may include a video imaging camera that repeatedly captures successive images of the trailer 12 that may be processed to identify the sticker 52 and its location on the trailer 12 for determining movement of the sticker 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on the passenger cab 54 of the vehicle 14 to capture images of a gooseneck trailer.

Additionally or alternatively, the target may include a number of user-selected points on the trailer 12 and the camera 46 may be employed to track the points on the trailer 12 to determine the hitch angle γ between the vehicle 14 and the trailer 12 based on the movement of the points within successive camera images. The points may be selected by a vehicle operator or other vehicle occupant through a human machine interface (HMI) 80, which may include a vehicle display 82 located within a passenger cab 54 of the vehicle 14. As exemplarily shown in FIG. 3, a captured image 31 taken by camera 46 is generated on a screen 29 of the vehicle display 82. The captured image 31 includes a rear-vehicle scene containing the tongue 36 of the trailer 12 and a side 33 of the trailer 12 that faces the vehicle 14. By modifying the field of view 50 of the camera 46, more or less of the trailer 12 may be visible in the captured image 31. For exemplary purposes, points 35a and 35b are selected by the vehicle operator or other vehicle occupant. Generally, a selected point(s) may correspond to a variety of objects or features located on the trailer 12. However, it is generally preferable to select objects or features that are easily distinguishable by the camera 46. For instance, the objects or features may have visual characteristics that make them easily imaged by the camera 46 including a discernable color and/or shape.

Figure 3:
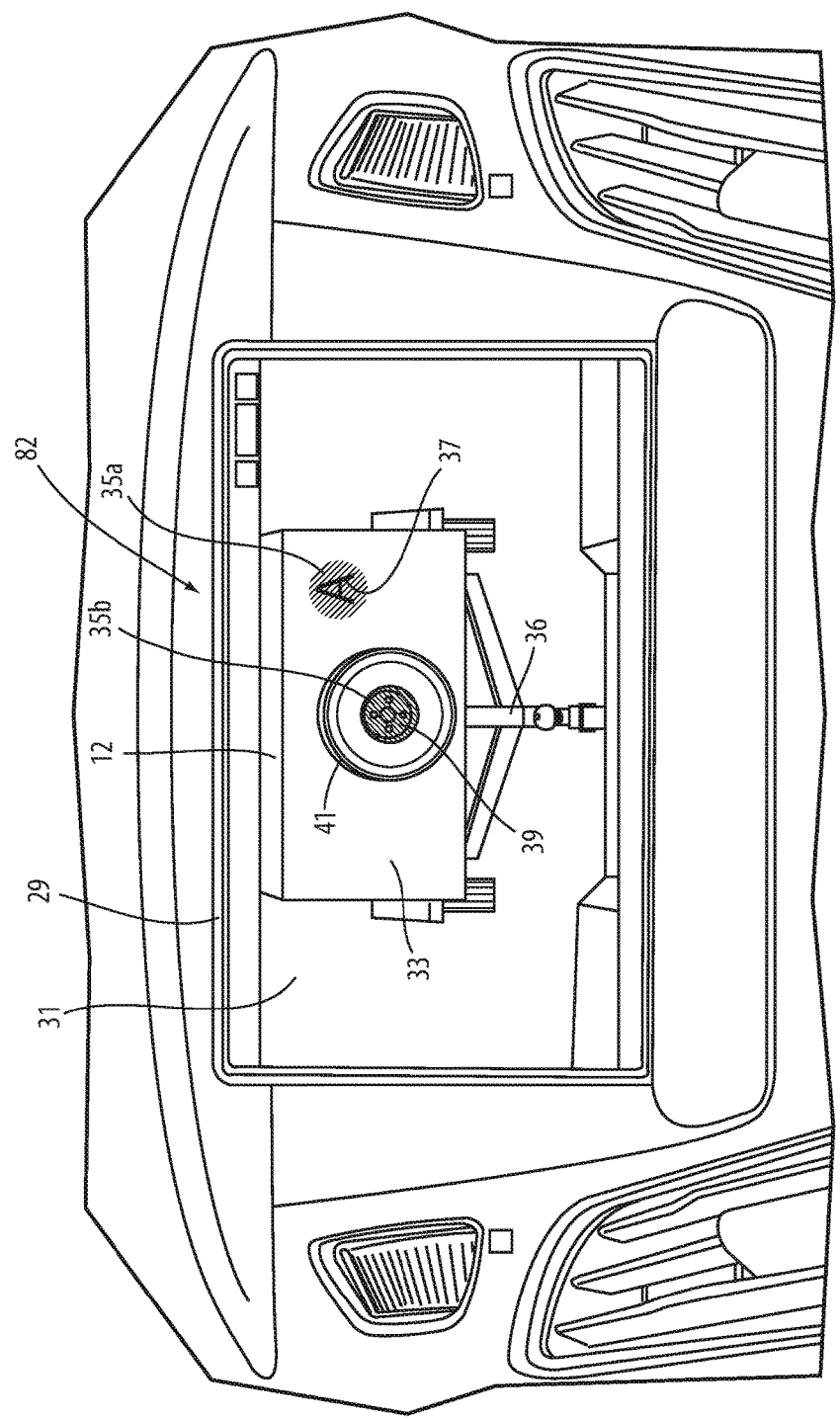
FIGS. 3 and 4 illustrate captured images displayed on a screen of a vehicle display showing different positions of an imaged trailer relative to a vehicle along with points on the imaged trailer that are tracked to determine a hitch angle between the vehicle and the trailer.

As shown in FIG. 3, point 35a corresponds to a dark lettering 37 located on side 33 of the trailer 12 whereas point 35b corresponds to a wheel component 39 of a spare wheel 41 that is mounted to the trailer 12. While two points 35a, 35b are shown, it is contemplated that more or less points may be selected in other embodiments. The points 35a, 35b may be selected via a touch event, whereby the vehicle operator or other vehicle occupant touches the screen 29 at the corresponding locations with his or her finger or a pointing device such as a stylus. Thus, it is to be understood that the screen 29 of the vehicle display 82 may be configured as a touch screen. The size of the points 35a, 35b may be set by default or otherwise fine-tuned by a user. For example, the size of the points 35a, 35b may be increased or decreased incrementally by turning the knob 30 in a clockwise or counterclockwise direction, respectively. It is contemplated that the size of the points 35a, 35b may be adjusted using other vehicle devices or through one or more additional touch events including a finger swipe, finger drag, and other motions. It is further contemplated that the points 35a, 35b are not limited to a circular shape and may include other shapes such as a square shape or other geometric shape.

Figure 4:
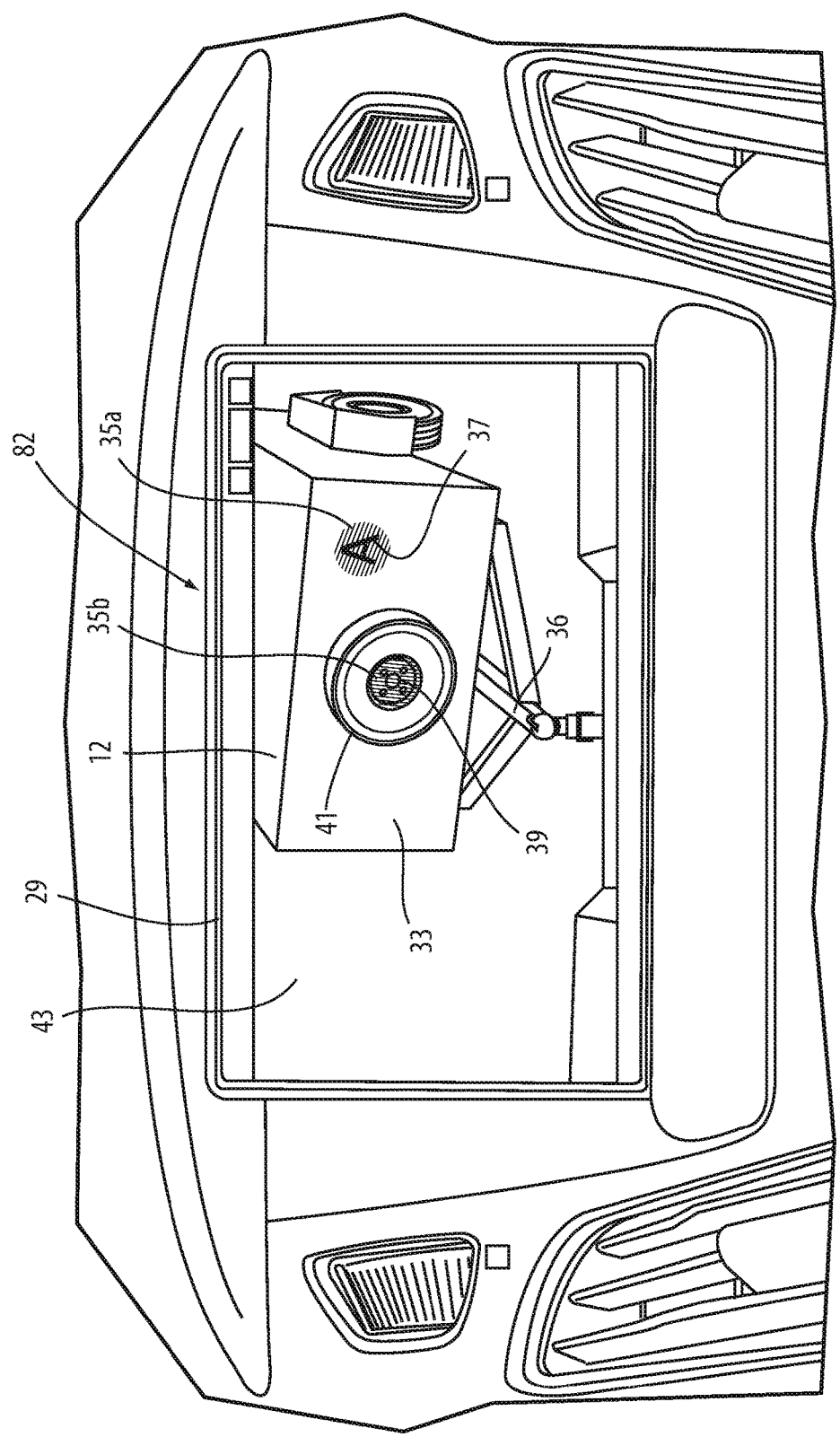

In practice, the points 35a, 35b should be selected when the vehicle 14 and the trailer 12 are in substantial alignment, that is, positioned in a straight line as appearing in the captured image 31 shown in FIG. 3. Once the vehicle 14 and the trailer 12 have been aligned and the points 35a, 35b selected, the image coordinates of points 35a and 35b are supplied to the controller 28 so that the controller 28 can acquire images of the lettering 37 and the wheel component 39, respectively, and associate those images with the corresponding points 35a, 35b. Later, as the trailer 12 moves relative to the vehicle 14, during a backup maneuver, for example, the controller 28 may analyze captured images to track the new position of the points 35a, 35b within the captured images. For example, a subsequent captured image 43 taken by the camera 46 is shown in FIG. 4 showing a new position of points 35a and 35b, respectively. The controller 28 may analyze the changes to pixels between the captured images 31, 43 and relate those changes to a corresponding angular position change in degrees of points 35a and 35b, wherein the position of points 35a and 35b in captured image 31 serve as the reference points. In this manner, the angular position change of points 35a and 35b with respect to the position of points 35a and 35b in captured image 31 is equivalent to the hitch angle γ between the vehicle 14 and the trailer 12.

Figure 5:
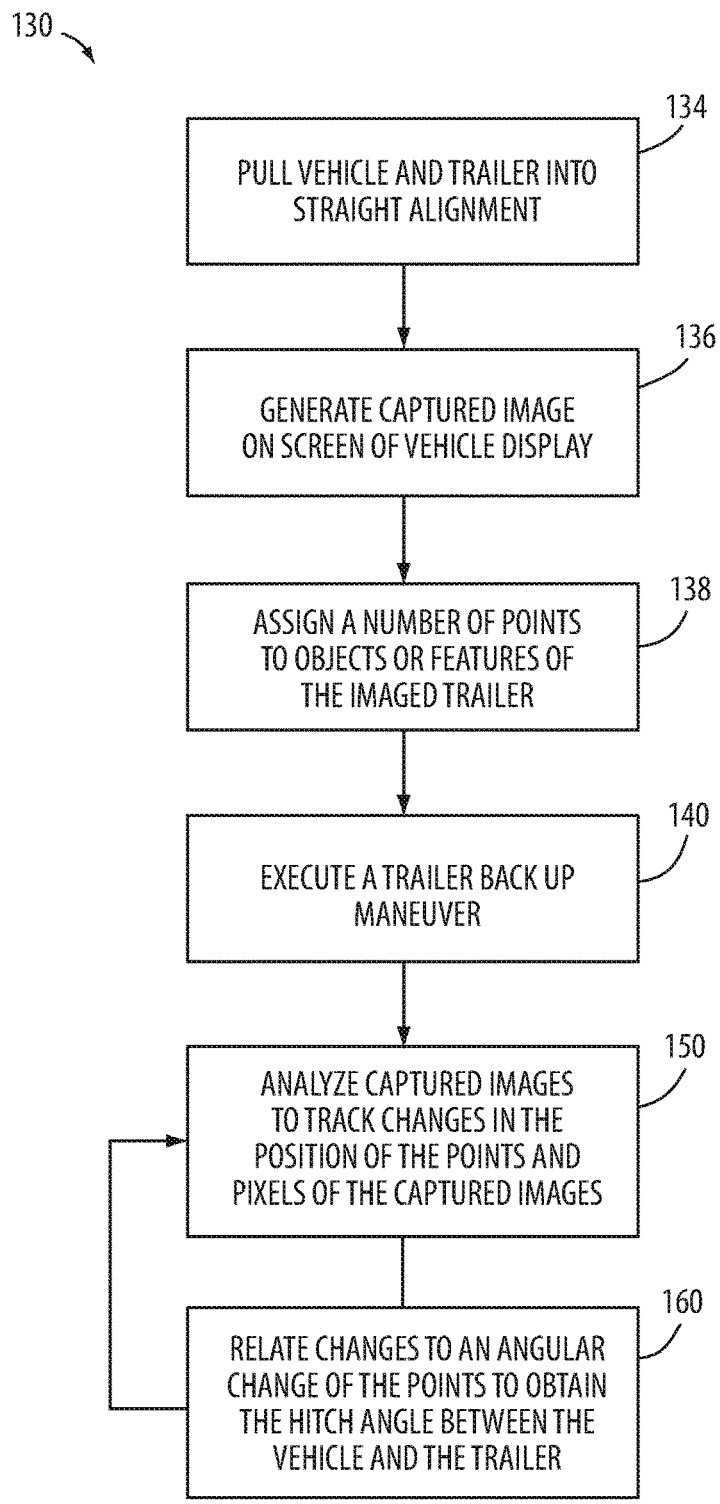
FIG. 5 is a flow diagram illustrating a method of monitoring a hitch angle between a vehicle and a trailer, according to one embodiment.

Referring to FIG. 5, a method of monitoring a hitch angle γ between a vehicle 14 and a trailer 12 of the trailer backup assist system 10 is illustrated and may correspond to one embodiment of a hitch angle estimation routine 130 (FIG. 2). At step 134, the vehicle 14 and the trailer 12 are pulled into straight alignment. When the vehicle 14 and trailer 12 are straightened, the vehicle operator may be notified of the same via an auditory alert, a visual alert, a tactile alert, or a combination thereof. At step 136, a captured image taken by the camera 46 is generated on the screen 29 of the vehicle display 82. At step 138, a number of points are assigned to objects or features of the trailer 12 appearing in the captured image shown on screen 29. As described herein the screen 29 may be a touchscreen, thereby enabling a user to assign points via one or more touch events. Once the points have been assigned, the vehicle operator initiates a trailer backup maneuver at step 140. While the trailer backup maneuver is underway, the processor continues to analyze captured images taken by the camera 46 to track changes in the pixels within the captured images at step 150. The changes are ultimately related to an angular position change of the points 35a, 35b to obtain the hitch angle γ between the vehicle 14 and the trailer at step 160, as described herein previously. Steps 150 and 160 may be repeated for the duration of the trailer backup maneuver to provide instantaneous hitch angle γ estimations between the vehicle 14 and the trailer 12.

Referring back to FIGS. 1 and 2, an additional camera 53 may be provided in a side mirror assembly 55 located on the passenger side of the vehicle 14. It is to be understood that the side mirror assembly on the driver side of the vehicle 14 may also be similarly configured. As shown, the camera 53 has a field of view 57 located and oriented to capture images that may include a rear-vehicle operating environment 59 and a side-vehicle operating environment 61. Camera 53 may include a video imaging camera that repeatedly captures successive images that may be processed to assist in a variety of functions. For instance, images captured by the camera 53 may be processed to determine trailer sway of the trailer 12. In another instance, images captured by the camera 53 may be processed for object detection, blind spot detection, and the like. In yet another instance, the images captured by the camera 53 may be processed and displayed on vehicle display 82 or other display to assist the vehicle operator during a trailer backup maneuver. It is contemplated that the images captured by the camera 53 may be processed alongside images captured by any other cameras located on the vehicle 14 and/or trailer 12 to generate composite images that are displayed on vehicle display 82 or other display. For example, points $P_1$, $P_2$, $P_3$, and $P_4$ exemplarily show other possible camera locations on the vehicle 14 and trailer 12. While not shown, cameras may also be located on the roof of the vehicle 14 and/or trailer 12. It is contemplated that captured images from camera 53 may be combined with those taken from other cameras located variously on the vehicle 14 and/or trailer 12, as described herein, to generate a 360 degree view on vehicle display 82 or other display. The 360 degree view may be generated using images taken by only cameras mounted to the vehicle 14, only cameras mounted to the trailer 12, or a combination of cameras mounted to both the vehicle 14 and the trailer 12. Thus, it should be appreciated that the camera 53 may be operated independently of whether the vehicle 14 is attached to the trailer 12 or a trailer backup related feature is underway.

Figure 6:
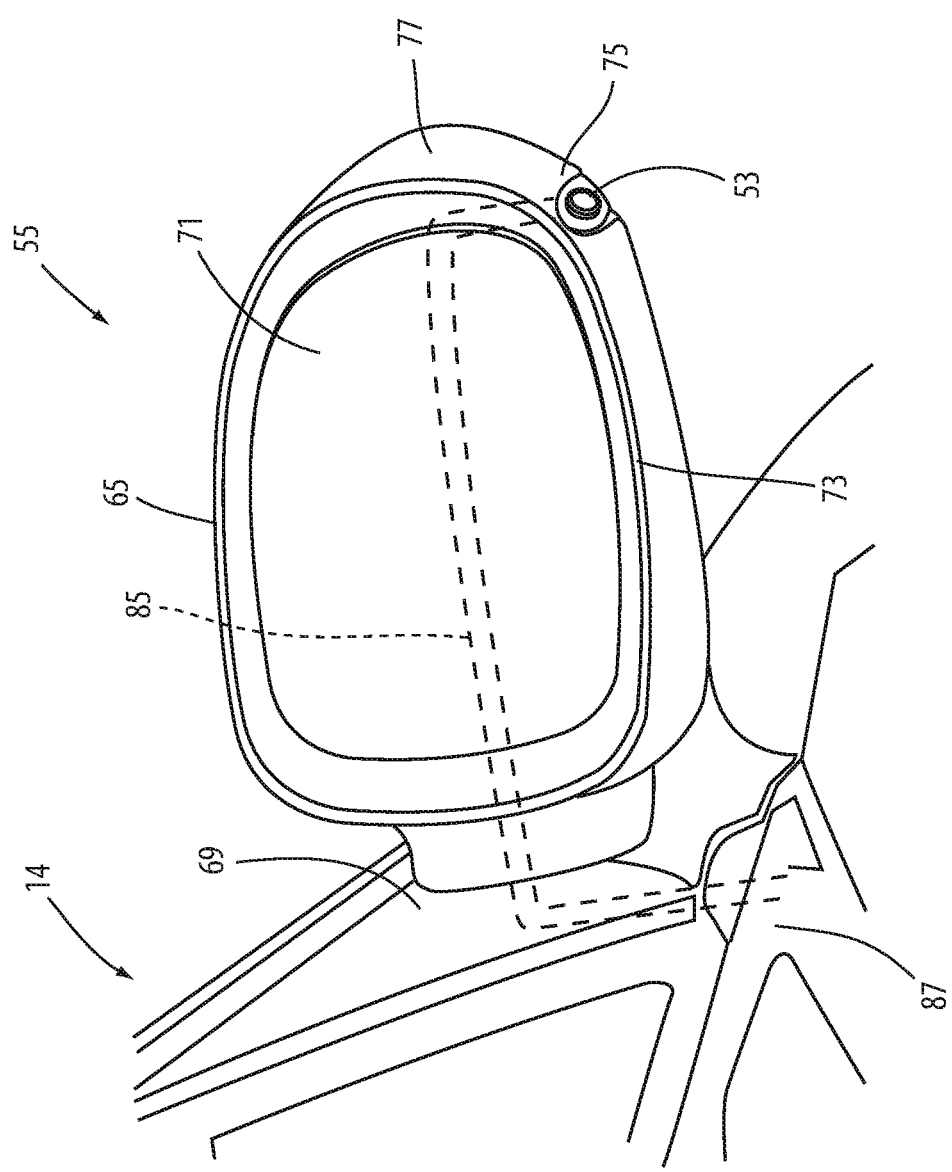
FIG. 6 is an enlarged perspective view of the side mirror assembly having a camera for capturing images of a rear and side-vehicle operating environment, as shown in area VI of FIG. 1, marked as VI.

According to one embodiment, the camera 53 may be mounted to a body portion 65 of the side mirror assembly 55 as shown in FIG. 6. A securing member 69 extends from the body portion 65 and is fixedly coupled to the vehicle 14. The body portion 65 houses a side mirror 71 and includes a lower portion 73 below the side mirror 71. The camera 53 may be located in a lower corner region 75 of the body portion 65 defined by the lower portion 73 and a side portion 77 of the body portion 65. The lower corner region 75 is formed so as not to obstruct the field of view 57 of the camera 53. The camera 53 may be left partially exposed or otherwise covered by a substantially clear cover. However, by virtue of its location on the body portion 65, the camera 53 is generally well shielded against the operating environment of the vehicle 14 while the vehicle 14 is in an operational state. The camera 53 may be communicatively coupled to the controller 28 of the trailer backup assist system 10 or other controller through wiring 85 that extends from within the body portion 65 and through a frame side door frame 87 of the vehicle 14. The controller 28 may be configured to process images captured by the camera 53 and may display the captured images on the vehicle display 82 and/or analyze the captured images while performing trailer backup related functions.

Figure 7:
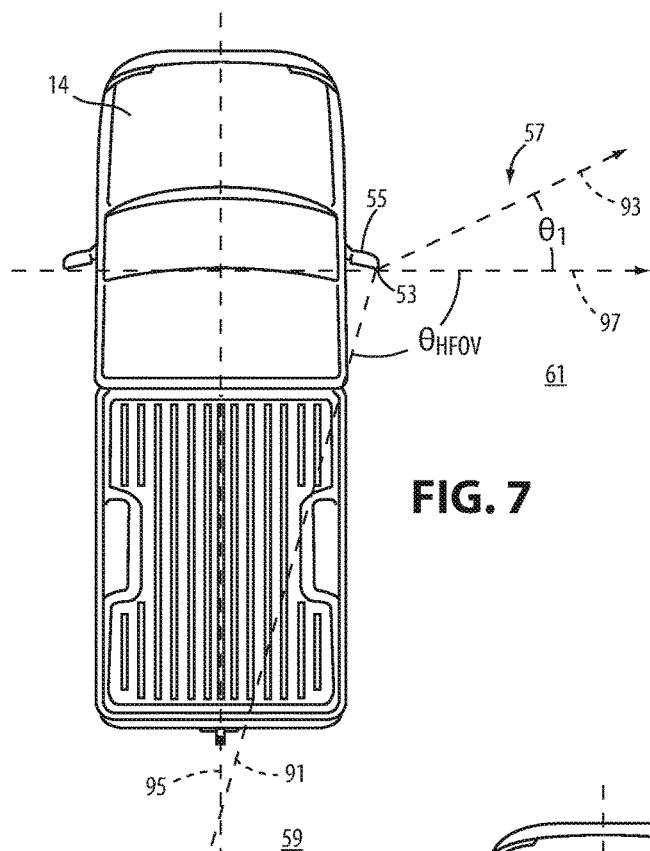
FIG. 7 is a schematic diagram that illustrates a horizontal field of view angle of the camera shown in FIG. 6, according to one embodiment.
Figure 8:
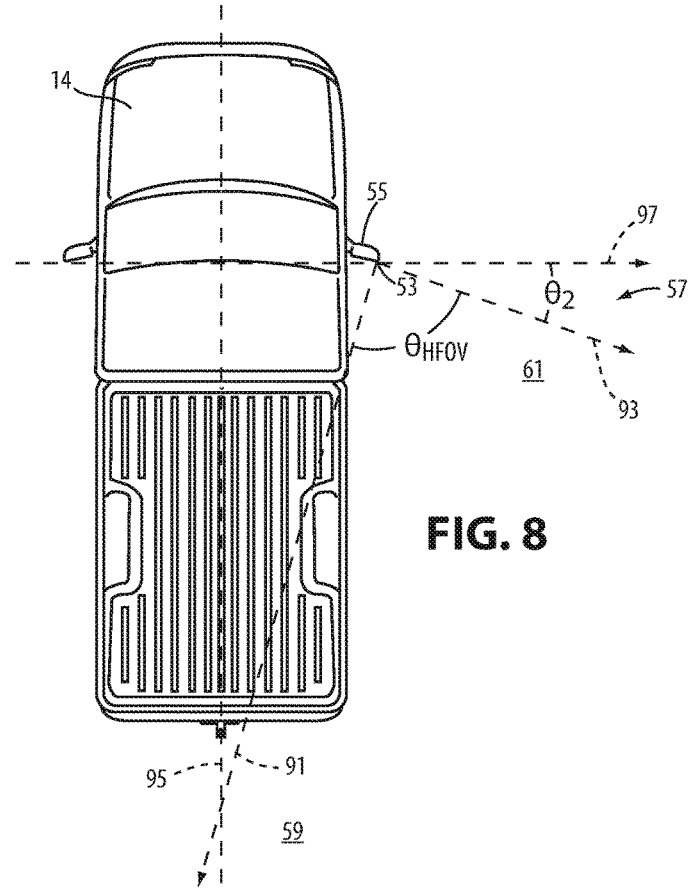
FIG. 8 is a schematic diagram illustrating horizontal field of view angle of the camera shown in FIG. 6, according to another embodiment.

According to one embodiment, as shown in FIG. 7, the camera 53 includes a horizontal field of view (HFOV) angle $\theta_{HFOV}$ defined by first and second horizontal extents 91 and 93. As shown, horizontal extent 91 extends through the vehicle 14 and intersects with a centerline longitudinal axis 95 of the vehicle 14 whereas horizontal extent 93 extends forward and to the right of the vehicle 14 and is located in front (at angle $\theta_1$) of a lateral axis 97 of the vehicle 14 that intersects the camera 53. In the illustrated embodiment, the HFOV angle $\theta_{HFOV}$ is substantially obtuse, that is, greater than 90 degrees. By increasing the angle $\theta_1$, a greater portion of the side-vehicle operating environment 61 can be imaged. Alternatively, as shown in FIG. 8, horizontal extent 93 may be located behind the lateral axis 97 of the vehicle 14 (at angle $\theta_2$), thereby decreasing the portion of the side-vehicle operating environment 61 that can be imaged by the camera 53. In this embodiment, the HFOV angle $\theta_{HFOV}$ may be substantially obtuse, normal (i.e. 90 degrees), or acute (i.e., less than 45 degrees). While not shown, the horizontal extent 93 may coincide with the lateral axis 97 of the vehicle 14 in other embodiments.

Referring back to FIG. 1, the embodiment of the sensor module 20 includes a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21, in additional embodiments, may be mounted on alternative portions of the trailer 12.

The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, and the wheel speed sensors 23. Accordingly, in the illustrated embodiment, the yaw rate sensor 25 and the accelerometer 27 are contained within the housed sensor cluster 21, although other configurations are conceivable. It is conceivable that the accelerometer 27, in some embodiments, may be two or more separate sensors and may be arranged at an offset angle, such as two sensors arranged at plus and minus forty-five degrees from the longitudinal direction of the trailer or arranged parallel with the longitudinal and lateral directions of the trailer, to generate a more robust acceleration signal. It is also contemplated that these sensor signals could be compensated and filtered to remove offsets or drifts, and smooth out noise. Further, the controller 28 may utilize processed signals received outside of the sensor system 16, including standard signals from the brake control system 72 and the power assist steering system 62, such as vehicle yaw rate $\omega_1$, vehicle speed $v_1$, and steering angle $\delta$, to estimate the trailer hitch angle $\gamma$, trailer speed, and related trailer parameters. As described in more detail below, the controller 28 may estimate the hitch angle $\gamma$ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

With reference to the embodiment of the trailer backup assist system 10 shown in FIG. 2, the trailer backup assist system 10 may receive vehicle and trailer status-related information from additional sensors and devices. The additional sensors and devices may be used in lieu of the hitch angle sensor 44 or the sensor module 20 in the event that one or more sensors (e.g., hitch angle sensor 44) used for determining the hitch angle $\gamma$ fail. This trailer status-related information includes positioning information from a positioning device 56, which may include a global positioning system (GPS) on the vehicle 14 or a hand held device, to determine a coordinate location of the vehicle 14 and the trailer 12 based on the location of the positioning device 56 with respect to the trailer 12 and/or the vehicle 14 and based on the estimated hitch angle $\gamma$. The positioning device 56 may additionally or alternatively include a dead reckoning system for determining the coordinate location of the vehicle 14 and the trailer 12 within a localized coordinate system based at least on vehicle speed, steering angle, and hitch angle $\gamma$. Other vehicle information received by the trailer backup assist system 10 may include a speed of the vehicle 14 from a speed sensor 58 and a yaw rate of the vehicle 14 from a vehicle yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to determine an indicator of the hitch angle $\gamma$, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64 via an internal torque, preventing manual intervention with the steering wheel 68 during autonomous steering. More specifically, a torque sensor 70 is provided on the power assist steering system 62 that senses torque (e.g., gripping and/or turning) on the steering wheel 68 that is not expected from autonomous control of the steering wheel 68 and therefore indicative of manual intervention by the driver. In some embodiments, external torque applied to the steering wheel 68 may serve as a signal to the controller 28 that the driver has taken manual control and for the vehicle 14 to discontinue steering maneuvers and/or alerts.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions, to guide the trailer 12 along the desired curvature. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative, or in addition to, the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10, in some embodiments, may regulate speed of the vehicle 14 during backing of the trailer 12, which can reduce the potential for unacceptable trailer backup conditions. Examples of unacceptable trailer backup conditions include, but are not limited to, a vehicle 14 over-speed condition, a high hitch angle rate, an inability to track the sticker 52 or the user-selected points (e.g., points 35*a*, 35*b*; FIGS. 3 and 4), trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. Unacceptable trailer backup conditions may result from the failure of one or more sensors (e.g., hitch angle sensor 44) and/or inputs (e.g., steering input device 18) on the vehicle 14 and/or trailer 12 to provide information to the controller 28 of the trailer backup assist system 10. In such events, the driver may be unaware of the failure until the unacceptable trailer backup condition is imminent or already happening. Therefore, it is disclosed herein that the trailer backup assist system 10 can generate an alert signal corresponding to a notification of an actual, impending, and/or anticipated unacceptable trailer backup condition, and prior to driver intervention, generate a counter measure to prevent such an unacceptable trailer backup condition, as further described herein.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability, or when the failure of a sensor and/or an input device is detected. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with the HMI 80 for the vehicle 14. The HMI 80 may include the vehicle display 82, such as a center-stack mounted navigation or entertainment display (FIG. 1) capable of displaying images indicating the alert. Such an embodiment may be desirable to notify the driver of the vehicle 14 that a sensor and/or input device used by the backup assist system 10 has failed. Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display an image indicating the sensor and/or input device that has failed. In addition, the portable device may provide feedback information, such as visual, audible, and tactile alerts.

As further illustrated in FIG. 2, the trailer backup assist system 10 includes the steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature of the desired backing path of travel of the trailer 12. Also, the trailer steering commands provided by the steering input device 18 can include information relating to a commanded change in the path of travel, such as an incremental change in the desired curvature, and information relating to an indication that the trailer 12 is to travel along a path defined by a longitudinal centerline axis of the trailer 12, such as a desired curvature value of zero that defines a substantially straight path of travel for the trailer. Given the importance of the steering input device 18 in controlling the vehicle 14 and trailer 12 while in motion, safety systems directed toward mitigating a failure of the steering input device 18 by generating a countermeasure may be a desirable feature in the trailer backup assist system 10. Accordingly, the controller 28 of the trailer backup assist system 10 may detect failure of the steering input device 18 and engage a countermeasure when the steering input device 18 fails, until the driver regains operational control of the vehicle 14.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all, or a portion of, the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including the hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 9:
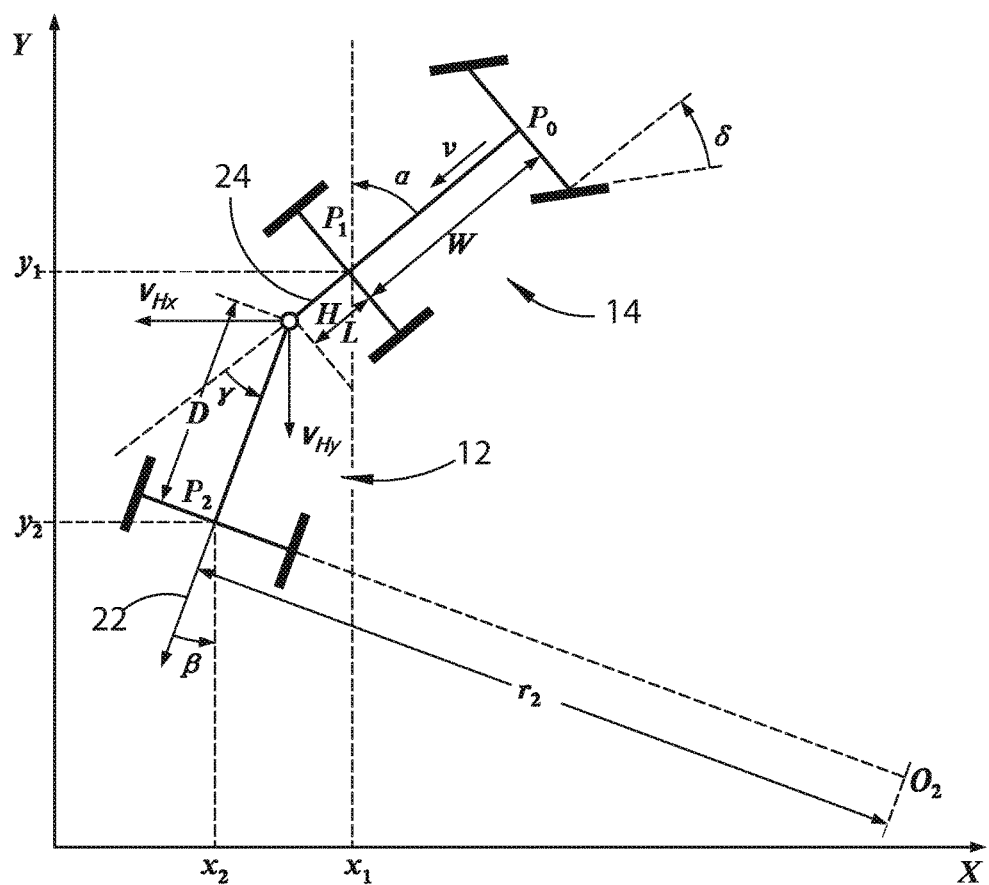
FIG. 9 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 9, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 9, for a system defined by a vehicle 14 and a trailer 12, the kinematic relationship is based on various parameters associated with the vehicle 14 and the trailer 12. These parameters include:

$\delta$: steering angle at steered front wheels of the vehicle;
$\alpha$: yaw angle of the vehicle;
$\beta$: yaw angle of the trailer;
$\gamma$: hitch angle ($\gamma=\beta-\alpha$);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle $\delta$ of the steered wheels 64 of the vehicle 14, and the hitch angle $\gamma$ can be expressed in the equation provided below. As such, if the hitch angle $\gamma$ is provided, the trailer path curvature $\kappa_2$ can be controlled based on regulating the steering angle $\delta$ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{\left(\left(W + \frac{KV^2}{g}\right)\cos\gamma - L\sin\gamma\tan\delta\right)}$$

This relationship can be expressed to provide the steering angle $\delta$ as a function of trailer path curvature $\kappa_2$ and hitch angle $\gamma$.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 10:
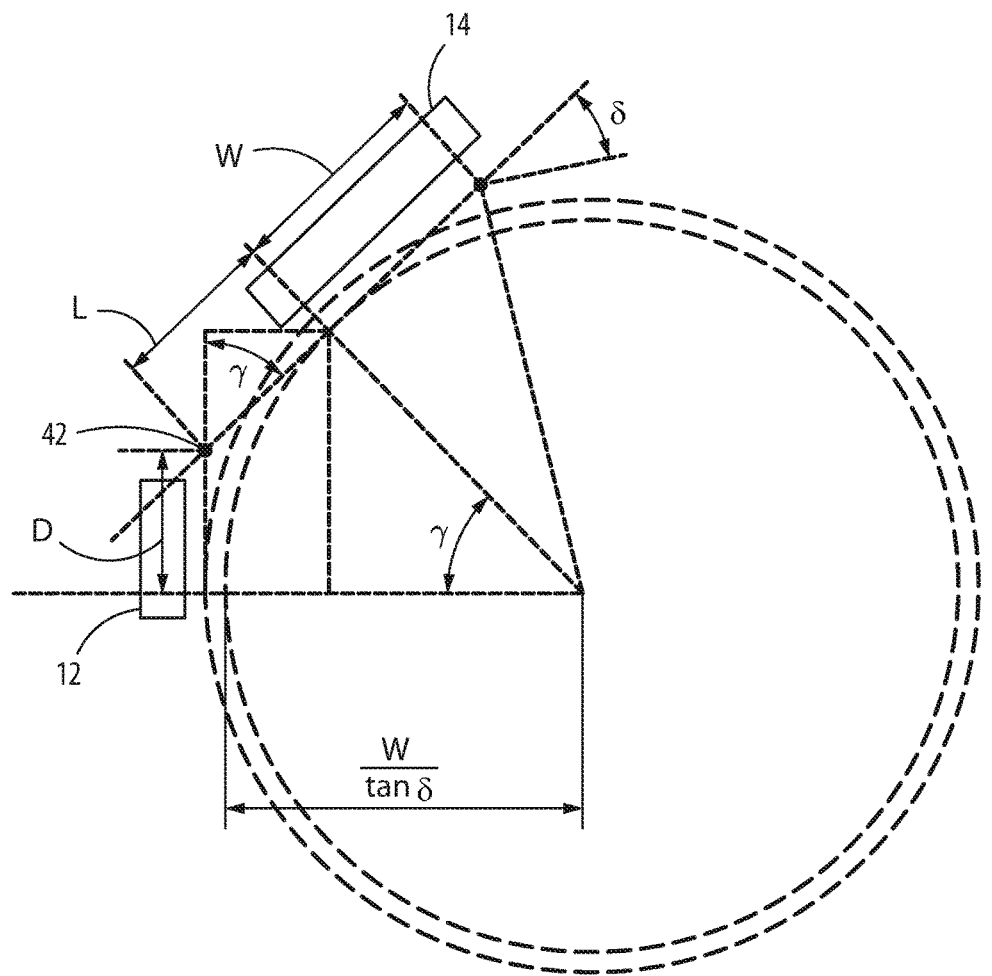
FIG. 10 is a schematic diagram showing a relationship between a hitch angle and a steering angle of the vehicle as it relates to curvature of the trailer and a jackknife angle.

Referring now to FIG. 10, in the illustrated embodiments of the disclosed subject matter, it may be desirable to limit the potential for the vehicle 14 and the trailer 12 to attain a jackknife angle (i.e., the vehicle/trailer system achieving a jackknife condition). A jackknife angle $\gamma(j)$ refers to a hitch angle $\gamma$ that while backing cannot be overcome by the maximum steering input for a vehicle such as, for example, the steered front wheels of the vehicle 14 being moved to a maximum steered angle $\delta$ at a maximum rate of steering angle change. The jackknife angle $\gamma(j)$ is a function of a maximum wheel angle for the steered wheels of the vehicle 14, the wheel base W of the vehicle 14, the distance L between hitch point and the rear axle of the vehicle 14, and the trailer length D between the hitch point and the axle of the trailer 12 or the effective axle when the trailer 12 has multiple axles. When the hitch angle $\gamma$ for the vehicle 14 and the trailer 12 achieves or exceeds the jackknife angle $\gamma(j)$, the vehicle 14 may be pulled forward to reduce the hitch angle $\gamma$. Thus, for limiting the potential for a vehicle/trailer system attaining a jackknife angle, it is preferable to control the yaw angle of the trailer 12 while keeping the hitch angle $\gamma$ of the vehicle/trailer system relatively small.

A kinematic model representation of the vehicle 14 and the trailer 12 can also be used to determine a jackknife angle for the vehicle-trailer combination. Accordingly, with reference to FIGS. 9 and 10, a steering angle limit for the steered front wheels requires that the hitch angle $\gamma$ cannot exceed the jackknife angle $\gamma(j)$, which is also referred to as a critical hitch angle $\gamma$. Thus, under the limitation that the hitch angle $\gamma$ cannot exceed the jackknife angle $\gamma(j)$, the jackknife angle $\gamma(j)$ is the hitch angle $\gamma$ that maintains a circular motion for the vehicle/trailer system when the steered wheels 64 are at a maximum steering angle $\delta(\max)$. The steering angle for circular motion with hitch angle $\gamma$ is defined by the following equation.

$$\tan\delta_{max} = \frac{w\sin\gamma_{max}}{D + L\cos\gamma_{max}}$$

Solving the above equation for hitch angle γ allows jackknife angle γ(j) to be determined. This solution, which is shown in the following equation, can be used in implementing trailer backup assist functionality in accordance with the disclosed subject matter for monitoring hitch angle γ in relation to jackknife angle.

$$\cos\bar{\gamma} = \frac{-b \pm \sqrt{b^2 - 4ac}}{2a}$$

where,
a=$L^2 \tan^2 \delta(max)+W^2$;
b=2 LD $\tan^2 \delta(max)$; and
c=$D^2 \tan^2 \delta(max)-W^2$.

In certain instances of backing the trailer 12, a jackknife enabling condition can arise based on current operating parameters of the vehicle 14 in combination with a corresponding hitch angle γ. This condition can be indicated when one or more specified vehicle operating thresholds are met while a particular hitch angle γ is present. For example, although the particular hitch angle γ is not currently at the jackknife angle for the vehicle 14 and attached trailer 12, certain vehicle operating parameters can lead to a rapid (e.g., uncontrolled) transition of the hitch angle γ to the jackknife angle for a current commanded trailer curvature and/or can reduce an ability to steer the trailer 12 away from the jackknife angle. One reason for a jackknife enabling condition is that trailer curvature control mechanisms (e.g., those in accordance with the disclosed subject matter) generally calculate steering commands at an instantaneous point in time during backing of a trailer 12. However, these calculations will typically not account for lag in the steering control system of the vehicle 14 (e.g., lag in a steering EPAS controller). Another reason for the jackknife enabling condition is that trailer curvature control mechanisms generally exhibit reduced steering sensitivity and/or effectiveness when the vehicle 14 is at relatively high speeds and/or when undergoing relatively high acceleration.

Jackknife determining information may be received by the controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing an estimated hitch angle γ, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU) that carries out trailer backup assist (TBA) functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still another embodiment, a predefined countermeasure or predefined set of countermeasures may be the applicable countermeasure(s).

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the power assist steering system 62 being directly coupled to the steering wheel 68. Accordingly, the steering input device 18 of the trailer backup assist system 10 may be used for inputting a desired curvature of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels of the vehicle 14, thereby allowing the steering wheel 68 to be used for commanding changes in the desired curvature of a trailer 12 or otherwise selecting a desired backing path during such trailer backup assist.

As described herein, the trailer backup assist system 10 may employ a camera 46 to track targets such as sticker 52 and/or user-selected points (e.g., points 35a, 35b; FIGS. 3 and 4) to determine the hitch angle γ between the vehicle 14 and the trailer 12. In some instances, however, the target(s) may become lost, that is, unable to be imaged by the camera 46. Examples of the target(s) becoming lost include when the target(s) is no longer in the field of view 50 of the camera 46, when the target(s) becomes obstructed by other objects or glare, and when the camera 46 malfunctions. When the target(s) becomes lost temporarily, the trailer backup assist system 10 may be unable to determine the hitch angle γ between the vehicle 14 and the trailer 12. Generally, the longer the target(s) remains lost, the greater the increase in hitch angle γ deviation depending on the speed at which the vehicle 14 and trailer 12 are traveling. As a result, a possible jackknife scenario may be encountered if countermeasures are not taken in response to the target(s) becoming lost.

Figure 11:
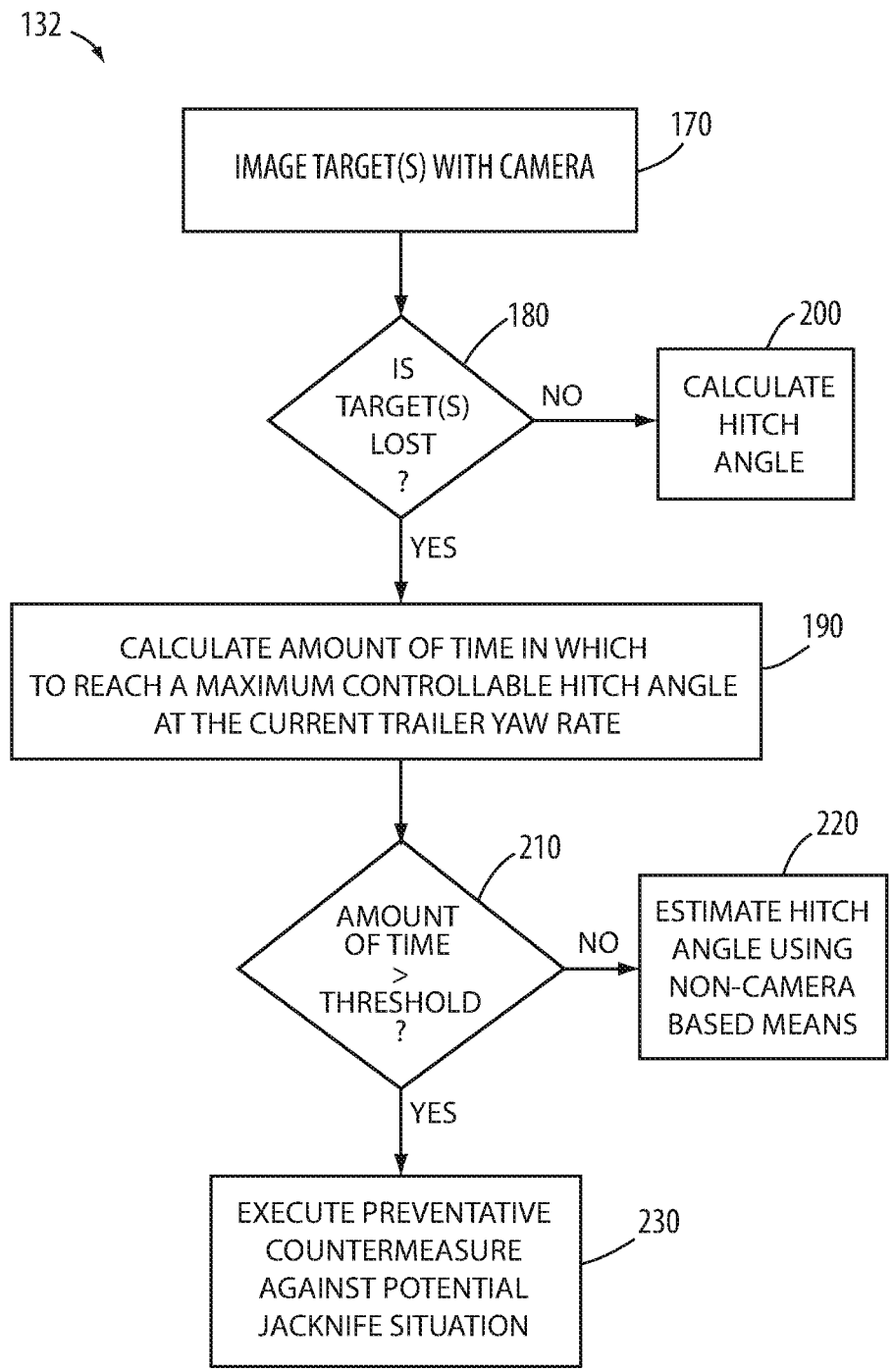
FIG. 11 is a flow diagram illustrating a method of managing a lost target, according to one embodiment.

Referring to FIG. 11, a method of managing a lost target of the trailer backup assist system 10 during a trailer backup maneuver is illustrated and may correspond to one embodiment of the operating routine 132 (FIG. 2). As described herein, the trailer backup assist system 10 may automatically steer the vehicle 14 once the trailer backup maneuver is underway. In some embodiments, the trailer backup assist system 10 may also dictate the speed of the vehicle 14 by actively controlling the vehicle brake control system 72 and/or the powertrain control system 74 of the vehicle 14. At step 170, the target or targets are imaged by the camera 46. If the target(s) becomes lost (decision block 180), the controller 28 calculates the amount of time in which to reach a maximum controllable hitch angle γ at the current trailer yaw rate at step 190. Otherwise, so long as the target(s) can be imaged, the hitch angle γ can be calculated at step 200 pursuant to any of the methods described herein such as that described in reference to FIG. 5. Thus, it is to be understood that the method of the presently illustrated embodiment may be seen as an extension to any of hitch angle detection methods described herein that rely on the use of camera 46.

At step 190, the trailer yaw rate may be supplied to the controller 28 via yaw rate sensor 25 (FIG. 2). If the amount of time is above a predetermined threshold (decision block 210), the controller 28 may estimate the hitch angle γ at step 220 using non-camera based means. For example, the controller 28 may estimate the hitch angle γ based on the trailer yaw rate $\omega_2$ provided by yaw rate sensor 25, the vehicle yaw rate $\omega_1$ provided by yaw rate sensor 60, and the vehicle speed $v_1$ provided by speed sensor 58 in view of the kinematic relationship between the trailer 12 and the vehicle 14 (FIG. 9). So long as the amount of time is above the predetermined threshold, the controller 28 may continue to estimate the hitch angle γ until the target is acquired again. If the amount of time is below the predetermined threshold (decision block 210), the controller 28 initiates a preventative countermeasure against a potential jackknife situation at step 230. The countermeasure may include alerting the vehicle operator to assume control of the steering wheel 68 of the vehicle 14 and/or the vehicle brake control system 72 (i.e., apply brakes). The alert may be visual, auditory, and/or haptic and may be realized using a variety of vehicle devices and systems. Additionally or alternatively, the countermeasure may include actively controlling the power assist steering system 62, the vehicle brake control system 72, and/or the powertrain control system 74 of the vehicle 14 to reduce the hitch angle γ and the speed of the vehicle 14 to an acceptable threshold until the vehicle operator assumes control of the steering wheel 68 of the vehicle 14. The controller 28 may be notified that the vehicle operator has assumed control of the steering wheel 68 based on feedback received from the torque sensor 70 of the power assist steering system 62 (FIG. 2) or an optional capacitive sensor(s) 250 disposed on the steering wheel 68 of the vehicle 14 (FIG. 1).

It is to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A side mirror assembly of a vehicle, comprising:
a securing member coupled to the vehicle;
a body portion extending outward from the securing member;
a side mirror housed by the body portion and having vehicle-lateral edges defining the vehicle-laterally-inboard-most and vehicle-laterally-outboard-most portions of the side mirror; and
a camera positioned outside of the vehicle-lateral-outboard-most portion of the side mirror for capturing images of a rear and a side-vehicle operating environment, wherein the camera includes a horizontal field of view angle defined by a first horizontal extent intersecting a centerline longitudinal axis of the vehicle rearwardly thereof and a second horizontal extent making an angle with a lateral axis of the vehicle that intersects the camera.

2. The side mirror assembly of claim 1, wherein the camera is located in a lower corner region of the body portion defined by a lower portion and a side portion of the body portion.

3. The side mirror assembly of claim 1, wherein the second horizontal extent is located in front of the lateral axis of the vehicle.

4. The side mirror assembly of claim 1, wherein the second horizontal extent is located behind the lateral axis of the vehicle.

5. The side mirror assembly of claim 1, wherein the second horizontal extent coincides with the lateral axis of the vehicle.

6. The side mirror assembly of claim 1, wherein the horizontal field of view angle is obtuse.

7. The side mirror assembly of claim 1, wherein the horizontal field of view angle is normal.

8. The side mirror assembly of claim 1, wherein the horizontal field of view angle is acute.

9. The side mirror assembly of claim 1, further comprising a controller for processing the captured images.

10. The side mirror assembly of claim 1, wherein the captured images are processed to at least one of generate a 360 degree view of the vehicle on a vehicle display and provide trailer reverse guidance during a trailer backup maneuver.

11. The side mirror assembly of claim 1, wherein the camera is coupled to the body portion.

12. A side mirror assembly of a vehicle, comprising:
a securing member coupled to the vehicle;
a body portion coupled to the securing member and extending outward therefrom;
a side mirror coupled to the body and having vehicle-lateral edges defining the vehicle-laterally-inboard-most and vehicle-laterally-outboard-most portions of the side mirror; and
a camera mounted side mirror-laterally-outboard of the side mirror for capturing images of a rear and a side-vehicle operating environment, wherein the camera includes a horizontal field of view angle defined by a first horizontal extent intersecting a centerline longitudinal axis rearwardly of the vehicle and a second horizontal extent making an angle with a lateral axis of the vehicle that intersects the camera; and
a controller for processing the captured images, wherein the captured images are processed to at least one of generate a 360 degree view of the vehicle on a vehicle display and provide trailer reverse guidance during a trailer backup maneuver.

13. The side mirror assembly of claim 12, wherein the camera is located in a lower corner region of the body portion defined by a lower portion and a side portion of the body portion.

14. The side mirror assembly of claim 12, wherein the second horizontal extent is located in front of the lateral axis of the vehicle.

15. The side mirror assembly of claim 12, wherein the second horizontal extent is located behind the lateral axis of the vehicle.

16. The side mirror assembly of claim 12, wherein the second horizontal extent coincides with the lateral axis of the vehicle.

17. The side mirror assembly of claim 12, wherein the horizontal field of view angle is obtuse.

18. The side mirror assembly of claim 12, wherein the horizontal field of view angle is normal.

19. The side mirror assembly of claim 12, wherein the camera is coupled to the body portion.

20. A side mirror assembly of a vehicle, comprising:
a body portion having a lower portion and a side portion that is distal to the vehicle;
a side mirror housed by the body portion; and
a camera mounted to a lower corner region of the body portion vehicle-laterally-outboard of the side mirror for capturing images of a rear and a side-vehicle operating environment, wherein the lower corner region is defined by the lower portion and the side portion, and wherein the camera includes a horizontal field of view angle defined by a first horizontal extent intersecting a centerline longitudinal axis of the vehicle rearwardly of the vehicle and a second horizontal extent that coincides with a lateral axis of the vehicle that intersects the camera.

* * * * *